United States Patent
Cheng et al.

(10) Patent No.: US 7,881,389 B2
(45) Date of Patent: Feb. 1, 2011

(54) RECEPTION QUALITY NOTIFYING METHOD, WIRELESS COMMUNICATION TERMINAL APPARATUS, AND BASE STATION APPARATUS

(75) Inventors: Jun Cheng, Kyoto (JP); Kenichi Miyoshi, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1103 days.

(21) Appl. No.: 10/591,709

(22) PCT Filed: Mar. 8, 2005

(86) PCT No.: PCT/JP2005/004002

§ 371 (c)(1),
(2), (4) Date: Sep. 6, 2006

(87) PCT Pub. No.: WO2005/089000

PCT Pub. Date: Sep. 22, 2005

(65) Prior Publication Data

US 2007/0195897 A1    Aug. 23, 2007

(30) Foreign Application Priority Data

Mar. 12, 2004  (JP) ............................. 2004-071277

(51) Int. Cl.
H04K 1/10  (2006.01)

(52) U.S. Cl. ................. 375/260; 375/264; 375/324; 375/349; 455/134; 455/133; 455/432.2; 455/452.2; 455/67.13

(58) Field of Classification Search .............. 375/260, 375/264, 324, 327, 349; 455/452.2, 161.3, 455/277.2, 414.4, 432.2, 133–135, 414.5, 455/67.13; 379/88.14, 100.13, 142.03, 88.27; 708/204, 206, 622
See application file for complete search history.

(56) References Cited

U.S. PATENT DOCUMENTS 7,386,277 B2 *  6/2008  Cho et al. .................... 455/69

(Continued)

FOREIGN PATENT DOCUMENTS

WO       03/010984       2/2003

(Continued)

OTHER PUBLICATIONS

PCT International Search Report dated Jun. 21, 2005.

(Continued)

*Primary Examiner*—David C Payne
*Assistant Examiner*—Rahel Guarino
(74) *Attorney, Agent, or Firm*—Dickinson Wright PLLC

(57) ABSTRACT

A reception quality notifying method improves upstream-line throughput by reducing the data amount of reception quality data of downstream multicarrier signals to be transmitted in the upstream line. A low-power consumption base station apparatus and a wireless communication terminal apparatus may employ the reception quality notifying method. When a wireless communication terminal apparatus receives a downstream multicarrier signal and then notifies a base station apparatus of a subcarrier having a desirable reception quality for the downstream multicarrier signal, the wireless communication terminal apparatus produces reception quality data of a plurality of formats, then selects, from among the produced reception quality data, one having the lowest data mount. The selected reception quality data is transmitted to the base station apparatus by use of an upstream multicarrier signal subcarrier designated by the base station apparatus.

10 Claims, 9 Drawing Sheets

U.S. PATENT DOCUMENTS

2002/0119781 A1* 8/2002 Li et al. .................. 455/450
2003/0161285 A1* 8/2003 Tiedemann et al. ......... 370/332
2004/0248581 A1   12/2004 Seki et al.
2007/0287487 A1* 12/2007 Puig-Oses et al. .......... 455/501

FOREIGN PATENT DOCUMENTS

WO      03037027      5/2003
WO      03/073644     9/2003

OTHER PUBLICATIONS

"Comments on frequency scheduling and joint power and rate optimization for OFDM," (Lucent Technologies), Nov. 5-8, 2002, 3GPP TSG-WG#29, RI-02-1321.

Y. Hara, et al.; "MC-CDM System for Packet Communications Using Frequency Scheduling," The Institute of Electronics, Information and Communication Engineers, Technical Report of IEICE, NS2002-101 RCS2002-129, Jul. 2002, pp. 61-66 with English Abstract.

* cited by examiner

RECEPTION QUALITY NOTIFYING METHOD, WIRELESS COMMUNICATION TERMINAL APPARATUS, AND BASE STATION APPARATUS

TECHNICAL FIELD

The present invention relates to a method of notifying reception quality of a downlink multicarrier signal received in a radio communication terminal apparatus to a base station apparatus, and further, to the radio communication terminal apparatus and base station apparatus used in the method.

BACKGROUND ART

Conventionally, in HSDPA (High-Speed Downlink Packet Access) of 3GPP (3rd Generation Partnership Project), for high-speed downlink packet transmission, adaptive modulation in which a base station apparatus adaptively controls a modulation scheme used in a radio communication terminal apparatus according to a state of the propagation path, and scheduling in which the base station apparatus selects a radio communication terminal apparatus with a relatively good state of the propagation path to transmit a signal, are used. Further, in multicarrier transmission schemes such as OFDM (Orthogonal Frequency Division Multiplexing) and MC-CDMA (Multi Carrier-Code Division Multiple Access) under review as a transmission scheme in beyond 3G mobile communication system, high-speed transmission is implemented using a plurality of subcarriers.

In these multicarrier transmission schemes, since adaptive modulation and scheduling are performed for each subcarrier of a multicarrier signal, the radio communication terminal apparatus needs to notify instantaneous channel quality information (CQI: Channel Quality Indicator) of each subcarrier to the base station apparatus. Accordingly, in the multicarrier transmission system where adaptive modulation and scheduling are performed, each of a plurality of radio communication terminal apparatuses notifies CQIs of all the subcarriers in a downlink multicarrier signal to the base station apparatus, and the base station apparatus receiving the notifications, determines subcarriers, modulation scheme and coding rate in a downlink multicarrier signal to be transmitted to each of the radio communication terminal apparatuses using a predetermined scheduling algorithm with taken into consideration the CQIs from each of the radio communication terminal apparatuses.

When a base station apparatus simultaneously transmits downlink multicarrier signals to a plurality of radio communication terminal apparatuses in such a multicarrier transmission system, the base station apparatus performs frequency scheduling using CQIs for each subcarrier of downlink multicarrier signals transmitted from all the radio communication terminal apparatuses, assigns subcarriers of the downlink multicarrier signal with relatively good states of the propagation path to each of the plurality of radio communication terminal apparatuses, and determines a modulation scheme and coding rate so as to meet a predetermined packet error rate in the state of the propagation path.

Herein, in the multicarrier transmission system for performing adaptive modulation and scheduling, for example, when a downlink multicarrier signal is made up of sixty-four subcarriers, each radio communication terminal apparatus notifies sixty-four CQIs to the base station apparatus. Further, when each of sixty-four CQIs is expressed by five bits, each radio communication terminal apparatus needs to transmit 320 bits (=5 bits×64) of reception quality data for each downlink multicarrier signal in a single uplink multicarrier signal to the base station apparatus.

Non-patent Document 1: Hara, Kawabata, Duan, Sekiguchi, "MC-CDM System for Packet Communications Using Frequency Scheduling", Technical Report, July, 2002, RCS2002-129, pp. 61-pp. 66.

DISCLOSURE OF INVENTION

Problems to be Solved by the Invention

However, in the conventional radio communication terminal apparatus, since the data amount of CQIs to be transmitted to the base station apparatus is enormous, many of uplink channel resources are consumed for transmission of the CQIs, and the uplink throughput thereby deteriorates significantly, or power consumption for the transmission becomes larger, and therefore, a problem arises that power of a battery is consumed in a short period.

It is therefore an object of the present invention to provide a reception quality notifying method for reducing the data amount of reception quality data transmitted on uplink to a base station apparatus and improving the uplink throughput, and the base station apparatus used in the reception quality notifying method and the radio communication terminal apparatus with less power consumption.

Means for Solving the Problem

A reception quality notifying method according to the present invention has a reception step of receiving a multicarrier signal, a measurement step of measuring reception quality of the multicarrier signal on a subcarrier basis, a generation step of comparing a measurement result on the subcarrier basis in the measurement step with a predetermined threshold value and performing format conversion on a comparison result to generate a plurality of reception quality data expressed by bits, a selection step of selecting reception quality data with a smallest data amount from the plurality of generated reception quality data, and a transmission step of transmitting the selected reception quality data.

According to this method, a measurement result on a subcarrier basis is compared with a predetermined threshold value, the comparison result is subjected to format conversion, a plurality of reception quality data expressed by bits are thereby generated, and reception quality data with the smallest data amount is selected from the plurality of reception quality data and transmitted on uplink. Therefore, it is possible to release uplink channel resources that have been consumed for transmission of the reception quality data and improve the uplink throughput.

In a reception quality notifying method according to the present invention in the above-mentioned invention, the plurality of reception quality data generated in the generation step include first reception quality data in which the comparison result is expressed by bits in ascending order of subcarrier numbers of subcarriers constituting the multicarrier signal, and at least one of second reception quality data in which subcarrier numbers of subcarriers with reception quality more than or equal to the threshold value are expressed by bits based on the comparison result and third reception quality data in which subcarrier numbers of subcarriers with reception quality less than the threshold value are expressed by bits based on the comparison result.

According to this method, in addition to the effect of the above-mentioned invention, the first reception quality data in which the comparison result of the reception quality for each subcarrier of the multicarrier signal and the predetermined threshold value is expressed by bits in ascending order of subcarrier numbers, and the second or third reception quality data in which subcarrier numbers of subcarriers with reception quality more than or less than the threshold value are expressed by bits, are generated. It is thereby possible to generate a plurality of reception quality data with different data amounts on the downlink multicarrier signal, while suppressing an increase in amount of signal processing with simple technique.

In a reception quality notifying method according to the present invention in the above-mentioned invention, the plurality of reception quality data generated in the generation step include first reception quality data in which the comparison result is expressed by bits in ascending order of subcarrier numbers of subcarriers constituting the multicarrier signal, and second reception quality data in which subcarrier numbers of subcarriers with reception quality more than or equal to the threshold value are expressed by bits based on the comparison result, and further has a threshold value adjustment step of increasing the threshold value in the generation step when the number of other radio communication terminal apparatuses that perform communication using the multicarrier signal increases, and decreasing the threshold value when the number of the other radio communication terminal apparatuses decreases.

According to this method, in addition to the effect of the above-mentioned invention, the second reception quality data becomes easy to be selected in the selection step when the number of radio communication terminal apparatuses increases. Therefore, even when the uplink channel resources which can be occupied by each of the radio communication terminal apparatuses decrease in accordance with an increase of the number of the radio communication terminal apparatuses, it is possible to reduce uplink channel resources used by each of radio communication terminal apparatuses for transmission of the reception quality data, and thereby improve the uplink throughput for each of radio communication terminal apparatuses.

In a reception quality notifying method according to the present invention in the above-mentioned invention, the plurality of reception quality data generated in the generation step include first reception quality data in which the comparison result is expressed by bits in ascending order of subcarrier numbers of subcarriers constituting the multicarrier signal, second reception quality data in which subcarrier numbers of subcarriers with reception quality more than or equal to the threshold value are expressed by bits based on the comparison result, and third reception quality data in which subcarrier numbers of subcarriers with reception quality less than the threshold value are expressed by bits based on the comparison result, and further has a threshold value adjustment step of increasing the threshold value in the generation step when the number of other radio communication terminal apparatuses that perform communication using the multicarrier signal increases, and decreasing the threshold value when the number of the other radio transmission apparatuses decreases.

According to this method, in addition to the effect of the above-mentioned invention, the second reception quality data becomes easy to be selected in the selection step when the number of radio communication terminal apparatuses increases, while the third reception quality data becomes easy to be selected in the selection step when the number of radio communication terminal apparatuses decreases. Therefore, regardless of an increase or decrease in the number of radio communication terminal apparatuses, the second reception quality data or third reception quality data is easier to be selected than the first reception quality data, and it is thereby possible to always improve the uplink throughput.

In a reception quality notifying method according to the present invention in the above-mentioned invention, the first reception quality data, the second reception quality data or the third reception quality data is provided with a different identification number expressed by bits in at least one of a beginning part and a last part.

According to this method, in addition to the effect of the above-mentioned invention, the first to third reception quality data are provided in at least one of a beginning part and a last part with respective different identification numbers expressed by bits, and it is thereby possible for the base station apparatus to easily determine a format of the reception quality data.

A reception quality notifying method according to the present invention is a method in which a plurality of radio communication terminal apparatuses receiving downlink multicarrier signals reception quality of the downlink multicarrier signals to a base station apparatus transmitting the downlink multicarrier signals, and the method has a downlink transmission step of, in the base station apparatus, transmitting the downlink multicarrier signals to the plurality of radio communication terminal apparatuses, a downlink reception step of, in each of the plurality of radio communication terminal apparatuses, receiving a downlink multicarrier signal, a measurement step of, in each of the plurality of radio communication terminal apparatuses, measuring reception quality of the downlink multicarrier signal on a subcarrier basis, a generation step of, in each of the plurality of radio communication terminal apparatuses, comparing a measurement result on the subcarrier basis in the measurement step with a predetermined threshold value, performing format conversion on a comparison result to generate a plurality of reception quality data expressed by bits, a selection step of, in each of the plurality of radio communication terminal apparatuses, selecting reception quality data with a smallest data amount from the plurality of generated reception quality data, an extraction step of, in each of the plurality of radio communication terminal apparatuses, extracting control information included in the downlink multicarrier signal, an uplink signal generation step of, in each of the plurality of radio communication terminal apparatuses, assigning the reception quality data selected in the selection step to a subcarrier specified by the control information extracted in the extraction step to generate an uplink multicarrier signal, an uplink transmission step of, in each of the plurality of radio communication terminal apparatuses, transmitting the generated uplink multicarrier signal to the base station apparatus, an uplink reception step of, in the base station apparatus, receiving the uplink multicarrier signals respectively transmitted from the plurality of radio communication terminal apparatuses, a determination step of, in the base station apparatus, determining respective formats of the reception quality data included in the uplink multicarrier signals, a control information generation step of, in the base station apparatus, generating the control information for specifying the subcarrier to be assigned to the reception quality data in the uplink signal generation step in each of the plurality of radio communication terminal apparatuses according to the determined respective formats of the reception quality data, and a downlink signal generation step of, in the base station apparatus, generating the downlink multicarrier signals including the control information.

According to this method, a comparison result between the measurement result of the reception quality on a subcarrier basis of the downlink multicarrier signal and a predetermined threshold value is subjected to format conversion, a plurality of reception quality data expressed with bits are thereby generated, and reception quality data with the smallest data amount is selected from the plurality of reception quality data and transmitted on uplink. Therefore, it is possible to release uplink channel resources used for transmission of the reception quality data and improve the uplink throughput. Further, according to this method, since the base station apparatus specifies a subcarrier of an uplink multicarrier signal for use in transmission of the reception quality data of the downlink multicarrier signal to each of a plurality of radio communication terminal apparatuses, it is possible to prevent a plurality of radio communication terminal apparatuses from using subcarriers with the same frequency and prevent the reception quality data from being crashed and lost by collision on the propagation path.

In a reception quality notifying method according to the present invention in the above-mentioned invention, the plurality of reception quality data generated in the generation step include first reception quality data in which the comparison result is expressed by bits in ascending order of subcarrier numbers of subcarriers constituting the multicarrier signal and second reception quality data in which subcarrier numbers of subcarriers with reception quality more than or equal to the threshold value are expressed by bits based on the comparison result, and in the control information generation step, when the base station apparatus determines that the uplink multicarrier signals include the first reception quality data and the second reception quality data in the determination step, the base station apparatus generates the control information preferentially for a radio communication terminal apparatus transmitting the second reception quality data in the uplink transmission step rather than another radio communication terminal apparatus transmitting the first reception quality data in the uplink transmission step.

In a reception quality notifying method according to the present invention in the above-mentioned invention, the plurality of reception quality data generated in the generation step include first reception quality data in which the comparison result is expressed by bits in ascending order of subcarrier numbers of subcarriers constituting the multicarrier signal, second reception quality data in which subcarrier numbers of subcarriers with reception quality more than or equal to the threshold value are expressed by bits based on the comparison result and third reception quality data in which subcarrier numbers of subcarriers with reception quality less than the threshold value are expressed by bits based on the comparison result, and in the control information generation step, when the base station apparatus determines that the uplink multicarrier signals include the first reception quality data and at least one of the second reception quality data and the third reception quality data in the determination step, the base station apparatus generates the control information preferentially for a radio communication terminal apparatus transmitting the second reception quality data or the third reception quality data in the uplink transmission step rather than another radio communication terminal apparatus transmitting the first reception quality data in the uplink transmission step.

According to these methods, in addition to the effect of the above-mentioned invention, the base station apparatus gives instructions so that a radio communication terminal apparatus transmitting the second or third reception quality data has priority over another radio communication terminal apparatus transmitting the first reception quality data to use a subcarrier with reception quality more than or equal to a predetermined threshold value in the downlink multicarrier signal indicated by the second or third reception quality data in subsequent transmission of the reception quality data of the downlink multicarrier signal. Therefore, according to these methods, the base station apparatus makes the radio communication terminal apparatus, which is more likely to transmit again the second or third reception quality data with a smaller data amount than the first reception quality data, preferentially use the subcarrier of the uplink multicarrier signal. As a result, it is possible to further improve the uplink throughput of the overall radio communication system. Further, according to these methods, since the base station apparatus instructs the radio communication terminal apparatus transmitting the second or third reception quality data to transmit reception quality data of a subsequent downlink multicarrier signal with the subcarrier with good reception quality indicated by the reception quality data of the downlink multicarrier signal, it is possible to decrease a probability that the base station apparatus determines in error the identification number of the second or third reception quality data in regard to the reception quality data of the subsequent downlink multicarrier signal.

In a reception quality notifying method according to the present invention in the above-mentioned invention, the plurality of reception quality data generated in the generation step include first reception quality data, having a first identification number expressed by bits, in which the comparison result is expressed by bits in ascending order of subcarrier numbers of subcarriers constituting the multicarrier signal, and the second reception quality data, having a second identification number expressed by bits, in which subcarrier numbers of subcarriers with reception quality more than or equal to the threshold value are expressed by bits based on the comparison result, and in the generation step, when a data amount of the first reception quality data is the same as a data amount of the second reception quality data, each of the plurality of radio communication terminal apparatuses adds a plurality of second identification numbers to the second reception quality data to form difference between the data amount of the first reception quality data and the data amount of the second reception quality data.

According to this method, in addition to the effect of the above-mentioned invention, when the data amount of the first reception quality data is the same as the data amount of the second reception quality data, difference is formed in the data amount between the first reception quality data and the second reception quality data by increasing the data amount of the second reception quality data, and therefore, the radio communication terminal apparatus transmits the first reception quality data to the base station apparatus when the data amount of the first reception quality data is the same as the data amount of the second reception quality data. Thus, according to this method, the base station apparatus is capable of directly recognizing a subcarrier with good reception quality from the first reception quality data with a simpler format so that it is possible to reduce the load of signal processing in the determination step. Further, according to this method, since the data amount of the first reception quality data is always constant regardless of the state of the propagation path and a level of the threshold value used in the generation step, it is possible to decrease the error rate in determination of the format of the reception quality data in the determination step, as compared with the case where the radio communication terminal apparatus transmits the second or third reception quality data to the base station apparatus.

A radio communication terminal apparatus according to the present invention adopts a configuration provided with a receiver that receives a downlink multicarrier signal, a measurer that measures reception quality of the downlink multicarrier signal on a subcarrier basis, a generator that compares a measurement result on the subcarrier basis in the measurer with a predetermined threshold value and performs format conversion on a comparison result to generate a plurality of reception quality data expressed by bits, a selector that selects reception quality data with a smallest data amount from the plurality of generated reception quality data, and a transmitter that transmits an uplink multicarrier signal including the selected reception quality data.

According to this configuration, the generator performs format conversion on a comparison result of a measurement result on a subcarrier basis of the downlink multicarrier signal with a predetermined threshold value and generates a plurality of reception quality data expressed by bits, the selector selects the reception quality data with the smallest data amount from the plurality of generated reception quality data, the transmitter transmits the selected reception quality data of the downlink multicarrier signal in the uplink multicarrier signal to the base station apparatus, and it is thereby possible to release uplink channel resources used for transmission of the reception quality data of the downlink multicarrier signal, and to improve the uplink throughput.

A base station apparatus according to the present invention is a base station apparatus that performs radio communication with the radio communication terminal apparatus according to the present invention, and adopts a configuration provided with a transmitter that transmits downlink multicarrier signals to the plurality of radio communication terminal apparatuses, a receiver that receives uplink multicarrier signals including reception quality data indicating reception quality of the downlink multicarrier signals transmitted from the plurality of radio communication terminal apparatuses, a determiner that determines formats of the reception quality data included in the uplink multicarrier signals for each of the plurality of radio communication terminal apparatuses, and an assignment determiner that determines respective subcarriers to be assigned to the plurality of radio communication terminal apparatuses in accordance with the determined formats.

According to this configuration, since the assignment determiner specifies a subcarrier of an uplink multicarrier signal for use in transmission of the reception quality data of the downlink multicarrier signal to each of a plurality of radio communication terminal apparatuses, it is possible to prevent a plurality of radio communication terminal apparatuses from using subcarriers with the same frequency in the uplink multicarrier signal and prevent the reception quality data from being crashed and lost by collision on the propagation path.

Advantageous Effect of the Invention

According to the present invention, a plurality of reception quality data expressed by bits are generated by performing format conversion on a comparison result between the measurement result of the reception quality on a subcarrier basis of the downlink multicarrier signal and a predetermined threshold value, and reception quality data with a smallest data amount is selected from the plurality of generated reception quality data and transmitted to the base station apparatus in the uplink multicarrier signal. Therefore, it is possible to release uplink channel resources used for transmission of the reception quality data of the downlink multicarrier signal and improve the uplink throughput.

BEST MODE FOR CARRYING OUT THE INVENTION

Embodiments according to the present invention will be described below in detail with reference to accompanying drawings.

Embodiment 1

It is assumed in Embodiment 1 according to the present invention that OFDM radio communication is carried out in a radio communication system configured with a plurality of radio communication terminal apparatuses and a base station apparatus, and that the base station apparatus specifies frequencies i.e. subcarriers of an uplink multicarrier signal (OFDM signal) used by each of the radio communication terminal apparatuses, and thereby enables simultaneous communication between the base station apparatus and the plurality of radio communication terminal apparatuses.

Figure 1:
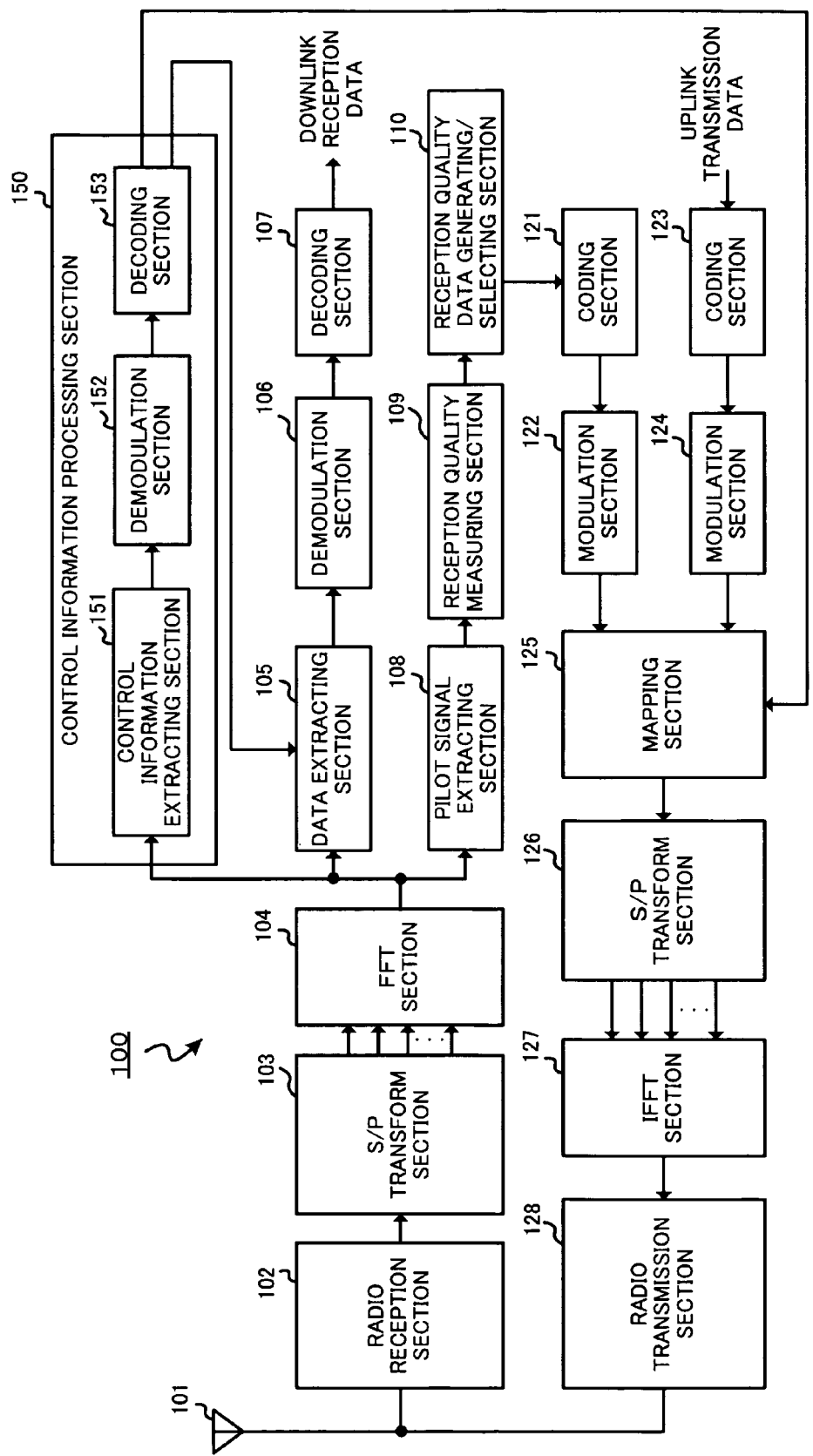
FIG. 1 is a block diagram illustrating a configuration of a radio communication terminal apparatus according to Embodiment 1 of the present invention.

FIG. 1 is a block diagram illustrating a configuration of radio communication terminal apparatus 100 according to Embodiment 1 of the present invention. Radio communication terminal apparatus 100 has antenna element 101, radio reception section 102, S/P transform sections 103 and 126, FFT section 104, data extracting section 105, demodulation section 106, decoding section 107, pilot signal extracting section 108, reception quality measuring section 109, reception quality data generating/selecting section 110, coding sections 121 and 123, modulation sections 122 and 124, mapping section 125, IFFT section 127, radio transmission section 128 and control information processing section 150. Control information processing section 150 has control information extracting section 151, demodulation section 152 and decoding section 153.

Antenna element 101 receives a downlink multicarrier signal transmitted from base station apparatus 200 described later, inputs the signal to radio reception section 102, while transmitting by radio an uplink multicarrier signal transmitted from radio transmission section 128 to base station apparatus 200.

Radio reception section 102 is configured with a band-pass filter, A/D converter, low noise amplifier and the like, performs predetermined received signal processing such as removal of noise, amplification, removal of a guard interval and the like on the downlink multicarrier signal inputted from antenna element 101, and inputs the downlink multicarrier signal subjected to the received signal processing to S/P transform section 103.

S/P transform section 103 transforms the downlink multicarrier signal inputted from radio reception section 102 into a plurality of parallel signals, and inputs the transformed parallel signals to FFT section 104.

FFT section 104 performs Fourier transform processing and the like on the plurality of parallel signals inputted from the S/P transform section 103 and transforms the signals into serial signals, and inputs the serial signals transformed from the downlink multicarrier signal to data extracting section 105, pilot signal extracting section 108 and control information extracting section 151.

Data extracting section 105 extracts an interval corresponding to subcarriers of the downlink multicarrier signal assigned to radio communication terminal apparatus 100 by base station apparatus 200 from the downlink multicarrier signal inputted from FFT section 104, and inputs the downlink multicarrier signal of the extracted interval to demodulation section 106. In addition, the subcarriers of the downlink multicarrier signal assigned to radio communication terminal apparatus 100 are identified by control information processing section 150 described later, and notified from decoding section 153 in control information processing section 150 to data extracting section 105.

Demodulation section 106 demodulates the extracted interval of the downlink multicarrier signal inputted from data extracting section 105, and inputs the demodulated downlink multicarrier signal to decoding section 107.

Decoding section 107 decodes the demodulated downlink multicarrier signal inputted from demodulation section 106 and generates downlink reception data. Then, decoding section 107 inputs the generated downlink reception data to a baseband section and the like not shown.

Pilot signal extracting section 108 extracts a pilot signal from the downlink multicarrier signal inputted from FFT section 104, and inputs the extracted pilot signal to reception quality measuring section 109.

Reception quality measuring section 109 measures reception SIR (Signal to Interference Ratio) of the pilot signal contained in the downlink multicarrier signal inputted from pilot signal extracting section 108, and thereby measures reception SIR i.e. reception quality for each subcarrier on all the subcarriers constituting the downlink multicarrier signal. Then, reception quality measuring section 109 inputs measurement values of reception SIR for each subcarrier of the downlink multicarrier signal to reception quality data generating/selecting section 110.

Reception quality data generating/selecting section 110 compares a measurement value of reception SIR of each subcarrier of the downlink multicarrier signal inputted from reception quality measuring section 109 with preset threshold value T, first, generates first reception quality data expressing by bits the comparison result in ascending order of the subcarrier number, and then, by converting in format the first reception quality data, further generates second reception quality data expressing by bits subcarrier numbers of subcarriers with measurement values of reception SIR of the downlink multicarrier signal more than or equal to threshold value T, and third reception quality data expressing by bits subcarrier numbers of subcarriers with measurement values of reception SIR of the downlink multicarrier signal less than threshold value T. In addition, processes of generating the first to third reception quality data and data structure will be described later in detail. Further, reception quality data generating/selecting section 110 compares data amounts of the generated first to third reception quality data, selects reception quality data of the downlink multicarrier signal with the smallest data amount, adds an identification number indicating the format to the selected reception quality data of the downlink multicarrier signal, and inputs the reception quality data of the downlink multicarrier signal with the identification number added to coding section 121.

Coding section 121 encodes one of the first to third reception quality data of the downlink multicarrier signal inputted from reception quality data generating/selecting section 110 with a preset scheme, and inputs the coded reception quality data of the downlink multicarrier signal to modulation section 122.

Modulation section 122 modulates the reception quality data of the downlink multicarrier signal inputted from coding section 121 with a predetermined modulation scheme, and inputs the modulated reception quality data of the downlink multicarrier signal to mapping section 125.

Coding section 123 encodes uplink transmission data inputted from the baseband section not shown with a preset scheme, and inputs the coded uplink transmission data to modulation section 124.

Modulation section 124 modulates the uplink transmission data inputted from coding section 123 with a predetermined modulation scheme, and inputs the modulated uplink transmission data to mapping section 125.

Mapping section 125 performs mapping on the reception quality data of the downlink multicarrier signal inputted from modulation section 122 and the uplink transmission data inputted from modulation section 124 so that the data is placed in the same way as in the information (control information) of subcarriers of an uplink multicarrier signal notified from control information processing section 150 after being subjected to inverse Fourier transform processing and the like by IFFT section 127 described later. Further, mapping section 125 inputs the mapped reception quality data of the downlink multicarrier signal and mapped uplink transmission data to S/P transform section 126.

S/P transform section 126 transforms the mapped reception quality data of the downlink multicarrier signal and mapped uplink transmission data inputted from mapping section 125 into parallel signals, and inputs the parallel signals to IFFT section 127.

IFFT section 127 performs inverse Fourier transform and the like on the parallel signals inputted from S/P transform section 126 to transform into serial signals, and thereby generates an uplink multicarrier signal. Further, IFFT section 127 inputs the generated uplink multicarrier signal to radio transmission section 128.

Radio transmission section 128 is configured with a band-pass filter, D/A converter, low noise amplifier and the like, inserts a guard interval into the uplink multicarrier signal inputted from IFFT section 127, performs predetermined transmission signal processing such as amplification and frequency selection, and transmits by radio the uplink multicarrier signal to base station apparatus 200 via antenna element 101.

Control information processing section 150 performs predetermined received signal processing on the control information contained in the downlink multicarrier signal transmitted from base station apparatus 200. More specifically, in control information processing section 150, first, control information extracting section 151 extracts subcarriers assigned for the control information from the downlink multicarrier signal inputted from FFT section 104, demodulation section 152 then demodulates signals of the subcarriers extracted by control information extracting section 151 with a predetermined scheme, and subsequently, decoding section 153 decodes the signals demodulated in demodulation section 152 with a preset scheme and generates the control information. Herein, the generated control information includes information indicating subcarriers assigned in the downlink multicarrier signal to radio communication terminal apparatus 100 by base station apparatus 200, and information indicating subcarriers assigned in the uplink multicarrier signal to radio communication terminal apparatus 100 by base station apparatus 200. Then, control information processing section 150 inputs the information indicating subcarriers assigned in the downlink multicarrier signal to radio communication terminal apparatus 100 by base station apparatus 200 to data extracting section 105, while inputting the information indicating subcarriers assigned in the uplink multicarrier signal to radio communication terminal apparatus 100 by base station apparatus 200 to mapping section 125.

Figure 2:
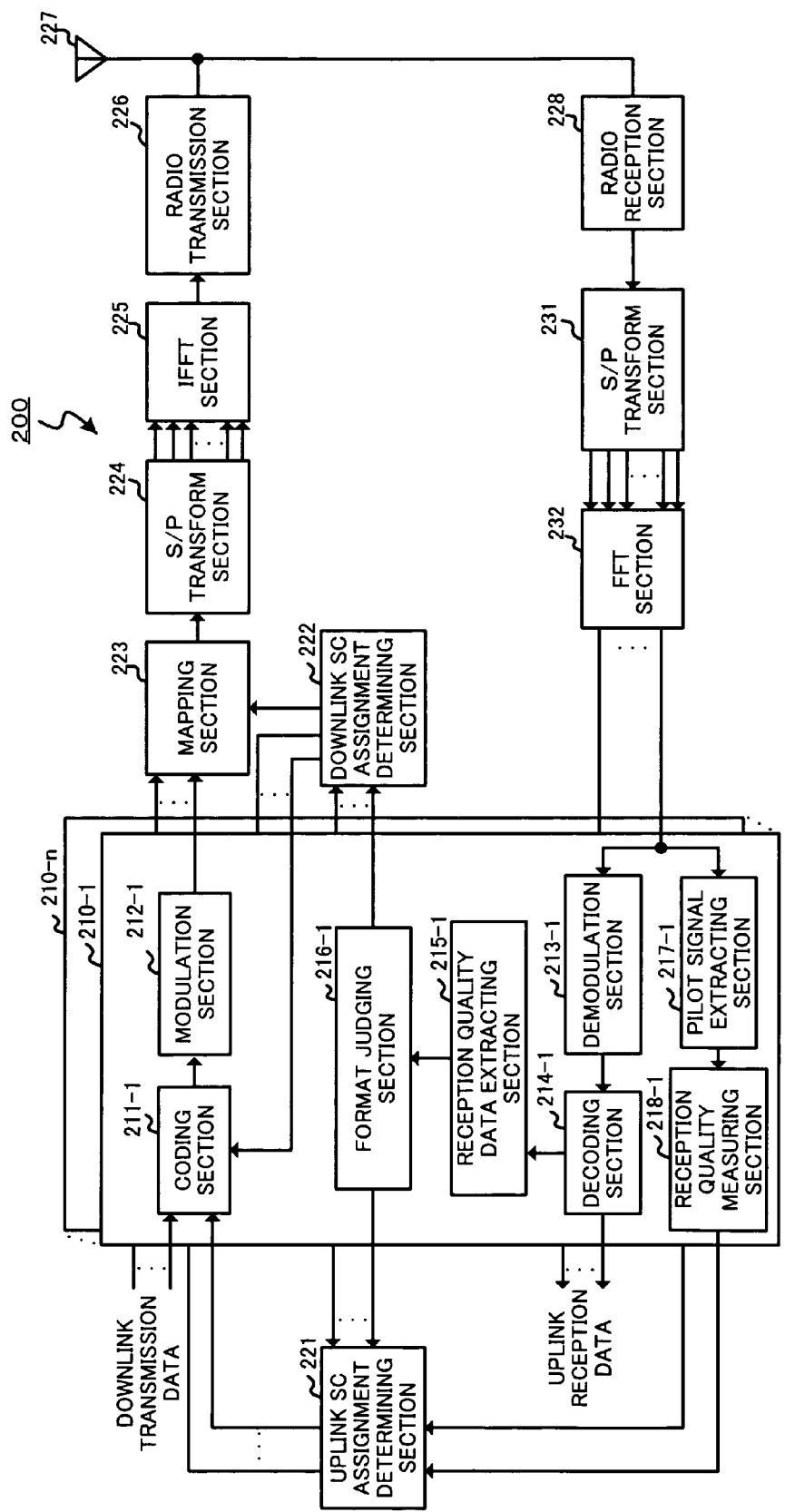
FIG. 2 is a block diagram illustrating a base station apparatus according to Embodiment 1 of the present invention.

Meanwhile, FIG. 2 is a block diagram illustrating a configuration of base station apparatus 200 according to this Embodiment. Base station apparatus 200 has a plurality of terminal response sections 210, uplink subcarrier (SC) assignment determining section 221, downlink SC assignment determining section 222, mapping section 223, S/P transform sections 224 and 231, IFFT section 225, radio transmission section 226, antenna element 227, radio reception section 228 and FFT section 232.

The same number of terminal response sections 210 are provided as the maximum number of radio communication terminal apparatuses 100 capable of simultaneously communicating with base station apparatus 200, and whenever terminal response section 210 is used, radio communication terminal apparatus 100 to respond to (take charge of) terminal response section 210 is determined. Further, each of terminal response sections 210 has coding section 211, modulation section 212, demodulation section 213, decoding section 214, reception quality data extracting section 215, format judging section 216, pilot signal extracting section 217 and reception quality measuring section 218. In addition, in FIG. 2, branch numbers 1 to n are respectively assigned to terminal response sections 210 to be distinguished from one another, but since terminal response sections 210-1 to 210-$n$ have the same function, the branch numbers are omitted as appropriate to explain the function and the like.

Antenna element 227 receives uplink signals transmitted from a plurality of radio communication terminal apparatuses 100, while transmitting by radio downlink multicarrier signals outputted from radio transmission section 226 to a plurality of radio communication terminal apparatuses 100.

Radio reception section 228 is configured with a band-pass filter, A/D converter, low noise amplifier and the like, performs predetermined received signal processing such as removal of noise, amplification and removal of a guard interval on the uplink multicarrier signals inputted from antenna element 227, and inputs the uplink multicarrier signals subjected to the received signal processing to S/P transform section 231.

S/P transform section 231 transforms the uplink multicarrier signals inputted from radio reception section 228 into a plurality of parallel signals, and inputs the transformed parallel signals to FFT section 232.

FFT section 232 performs the Fourier transform processing and the like on the plurality of parallel signals inputted from S/P transform section 231 and transforms the signals into serial signals, and inputs the serial signals transformed from the uplink multicarrier signals to demodulation sections 213-1 to 213-$n$ and pilot signal extracting sections 217-1 to 217-$n$ in terminal response sections 210-1 to 210-$n$.

Demodulation sections 213-1 to 213-$n$ extract only respective intervals according to corresponding radio communication terminal apparatuses 100 from the uplink multicarrier signals inputted from FFT section 232, and demodulate the uplink multicarrier signals at extracted intervals with a preset scheme. Further, demodulation section 213 inputs the demodulated uplink multicarrier signal to decoding section 214.

Decoding section 214 performs predetermined decoding processing on the uplink multicarrier signal of the interval inputted from demodulation section 213, generates uplink reception data, and inputs the generated uplink reception data to reception quality data extracting section 215, baseband section not shown and the like.

Reception quality data extracting section 215 extracts the reception quality data of the downlink multicarrier signal from the uplink multicarrier signal inputted from decoding section 214. Then, reception quality data extracting section 215 inputs the extracted reception quality data of the downlink multicarrier signal to format judging section 216.

Format judging section 216 refers to the identification number added to the reception quality data of the downlink multicarrier signal inputted from reception quality data extracting section 215 and judges the format. In other words, format judging section 216 judges whether the signal is the first, second or third reception quality data. Then, format judging section 216 inputs a judgment result to uplink SC assignment determining section 221, while inputting the reception quality data of the downlink multicarrier signal to downlink SC assignment determining section 222.

Each of pilot signal extracting sections 217-1 to 217-$n$ extracts only an interval according to corresponding radio communication terminal apparatus 100 from the uplink multicarrier signal inputted from FFT section 232, further extracts a pilot signal from the uplink multicarrier signal of the extracted interval, and inputs the extracted pilot signal of the uplink multicarrier signal to reception quality measuring sections 218-1 to 218-$n$.

Reception quality measuring section 218 measures reception SIR of the pilot signal contained in the uplink multicarrier signal inputted from pilot signal extracting section 217, and thereby measures reception SIR i.e. reception quality for each subcarrier on all the subcarriers constituting the uplink multicarrier signal. Then, reception quality measuring section 218 inputs measurement values of reception SIR for each subcarrier of the uplink multicarrier signal to uplink SC assignment determining section 221.

Uplink SC assignment determining section 221 determines subcarriers of an uplink multicarrier signal to assign to each of radio communication terminal apparatuses 100, using judgment results on the format of the reception quality data of the downlink multicarrier signal inputted from format judging sections 216-1 to 216-n, and reception SIR for each subcarrier of the uplink multicarrier signal inputted from reception quality measuring sections 218-1 to 218-n. In the assignment of subcarriers of the uplink multicarrier signal, subcarriers are assigned preferentially to radio communication terminal apparatuses 100 transmitting the second or third reception quality data rather than radio communication terminal apparatuses 100 transmitting the first reception quality data. The reason will be described later. Further, uplink SC assignment determining section 221 inputs information of the subcarriers of the uplink multicarrier signal assigned to radio communication terminal apparatuses 100 to coding sections 211-1 to 211-n, respectively.

Downlink SC assignment determining section 222 recognizes subcarriers with good reception quality in the downlink multicarrier signal of each of radio communication terminal apparatuses 100 based on the reception quality data of the downlink multicarrier signal inputted from respective one of format judging sections 216-1 to 216-n, and determines that the subcarriers with good reception quality in the downlink multicarrier signal are assigned to each of radio communication terminal apparatuses 100. Herein, as a method of assigning subcarriers of a downlink multicarrier signal, well-known algorithms such as M as CIR method and proportional Fairness method are exemplified. Further, downlink SC assignment determining section 222 inputs information of the subcarriers of the downlink multicarrier signal assigned to radio communication terminal apparatuses 100 to mapping section 223 and coding sections 211-1 to 211-n, respectively. In addition, downlink SC assignment determining section 222 makes an adjustment so that the signal of the information of assigned subcarriers of the downlink multicarrier signal is transmitted by radio to radio communication terminal apparatus 100 somewhat before the downlink transmission data, with taken into consideration a time lag during which control information processing section 150 of radio communication terminal apparatus 100 identifies the assigned subcarriers and notifies the subcarriers to data extracting section 105, and then, data extracting section 105 extracts the subcarriers.

Coding section 211 generates the control information from the information of subcarriers of the uplink multicarrier signal inputted from uplink SC assignment section 221 and information of subcarriers of the downlink multicarrier signal inputted from downlink SC assignment section 222. Further, coding section 211 performs coding processing on the generated control information and downlink transmission data inputted from the baseband section or the like not shown with a preset scheme, and inputs the coding-processed control information and downlink transmission data to modulation section 212.

Modulation section 212 performs modulation processing on the control information and downlink transmission data inputted from coding section 211 with a predetermined scheme, and inputs the modulated downlink transmission signal to mapping section 223.

Mapping section 223 performs mapping on the modulated downlink transmission signals inputted from modulation sections 212-1 to 212-n so that the downlink transmission signals are assigned to the subcarriers indicated by the information of subcarriers of the downlink multicarrier signal inputted from downlink SC assignment determining section 222 after being subjected to the inverse Fourier transform processing and the like by IFFT section 225 described later. Then, mapping section 223 inputs the mapped signal to S/P transform section 224.

S/P transform section 224 transforms the mapped signal inputted from mapping section 223 into parallel signals, and inputs all the transformed parallel signals to IFFT section 225.

IFFT section 225 performs signal processing such as inverse Fourier transform and the like on the parallel signals inputted from S/P transform section 224, transform the signals into serial signals, thereby generates a downlink multicarrier signal, and inputs the generated downlink multicarrier signal to radio transmission section 226.

Radio transmission section 226 is configured with a band-pass filter, D/A converter, low noise amplifier and the like, inserts a guard interval into the downlink multicarrier signal inputted from IFFT section 225, performs predetermined transmission signal processing such as amplification and frequency selection, and transmits by radio the downlink multicarrier signal subjected to the predetermined transmission signal processing to a plurality of radio communication terminal apparatuses 100 via antenna element 227.

Figure 3:
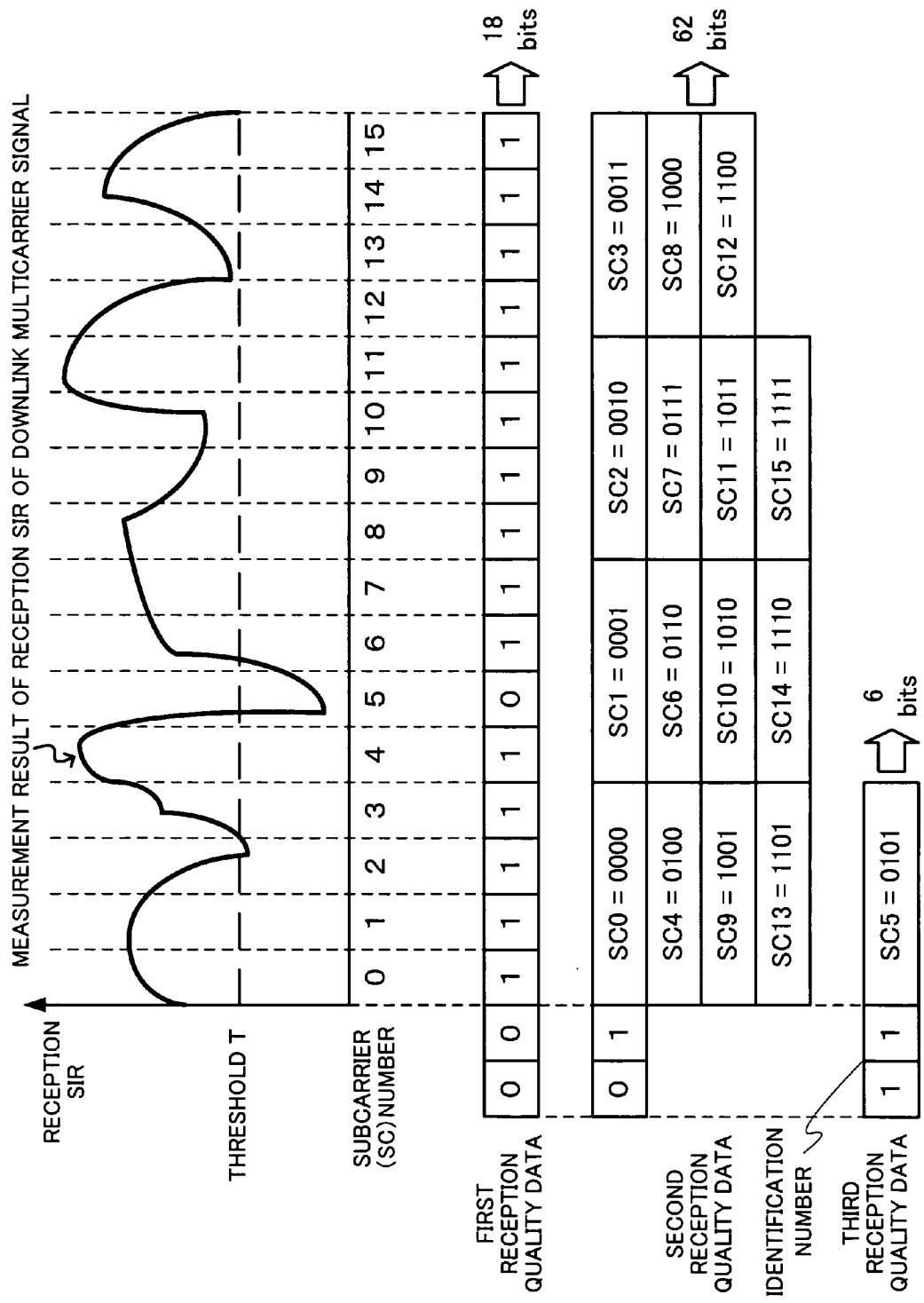
FIG. 3 is a view showing an example of a relationship between a measurement result of reception SIR for each subcarrier of a downlink multicarrier signal and a data amount of each of first to third reception quality data of the downlink multicarrier signal in Embodiment 1.

FIG. 3 shows an example of the measurement result of reception SIR for each subcarrier of the downlink multicarrier signal in reception quality measuring section 109 and each format of the first to third reception quality data. In the example as shown in FIG. 3, the downlink multicarrier signal is made up of sixteen subcarriers, and subcarrier (SC) numbers 0 to 15 are assigned to sixteen subcarriers in ascending order of the frequency. In FIG. 3, fifteen subcarriers except SC5 are subcarriers with measurement values of reception SIR of the downlink multicarrier signal more than or equal to threshold value T that is arbitrary set.

Herein, respective formats of the first to third reception data are described. In the first reception quality data, for subcarriers of the downlink multicarrier signal, a subcarrier with the measurement value of reception SIR more than or equal to threshold value T is expressed using a bit of "1", while a subcarrier with the measurement value of reception SIR less than threshold value T is expressed using a bit of "0". Further, an identification number of two bits, for example, "00" is added to the first reception quality data at least in its beginning or last part to enable format judging section 216 to identify the first reception quality data. Accordingly, in the format of the first reception quality data as shown in FIG. 3, the data amount is obtained by adding two bits of the identification number to bits of the total number of subcarriers, and, when the total number of subcarriers is assumed as N, the data amount is "2+N" bits. In the example as shown in FIG. 3, since N is "16" (N=16), the data amount of the first reception quality data is eighteen bits (2+16=18). Thus, the first reception quality data is directly generated from comparison between a measurement value of reception SIR of each subcarrier of the downlink multicarrier signal and threshold value T. The second reception quality data and third reception quality data described below are generated by converting the format of the first reception quality data.

In the second reception quality data, a subcarrier number of a subcarrier with the measurement value of reception SIR more than or equal to threshold value T in the downlink multicarrier signal is expressed by bits, and an identification number of two bits, for example, "01" to enable format judging section 216 to identify the second reception quality data is added at least in a beginning or last part of the data. Herein, when the total number of subcarriers is assumed as N and the SC number is expressed by bits, the data amount is $\log_2 N$. Then, when the number of subcarriers with the measurement value of reception SIR more than or equal to threshold value T is "M", the data amount of the second reception quality data as shown in FIG. 3 is "2+M×$\log_2 N$". Accordingly, in the example as shown in FIG. 3, since $N=16=2^4$ and $M=15$, the data amount of the second reception quality data is sixty-two bits $(2+15\times4=62)$.

In the third reception quality data, a subcarrier number of a subcarrier with the measurement value of reception SIR less than threshold value T in the downlink multicarrier signal is expressed by bits, and an identification number of two bits, for example, "11" to enable format judging section 216 to identify the third reception quality data is added at least in a beginning or last part of the data. Herein, when the total number of subcarriers is assumed as N and the SC number is expressed by bits, the data amount is $\log_2 N$. This respect is the same as in the second reception quality data. Then, when the number of subcarriers with the measurement value of reception SIR more than or equal to threshold value T is "M", the data amount of the third reception quality data as shown in FIG. 3 is "$2+(N-M)\times\log_2 N$". Accordingly, in the example as shown in FIG. 3, since $N=16=2^4$ and $M=15$, the data amount of the third reception quality data is six bits $(2+(16-15)\times4=62)$.

In addition, when the number (N) of subcarriers of the downlink multicarrier signal is not two's power, in calculation of the data amount of the second reception quality data and third reception quality data, N is regarded as two's power which is larger than N and the closest to N. For example, when $N=20$, N is regarded as "$N=32=2^5$" in calculation of the data amount of the second reception quality data and third reception quality data.

Accordingly, in the measurement result of reception SIR of the downlink multicarrier signal as shown in FIG. 3, the data amount of the first reception quality data is 18 bits, the data amount of the second reception quality data is 62 bits, and the data amount of the third reception quality data is 6 bits. Therefore, in the example as shown in FIG. 3, reception quality data generating/selecting section 110 selects the third reception quality data.

Figure 4:
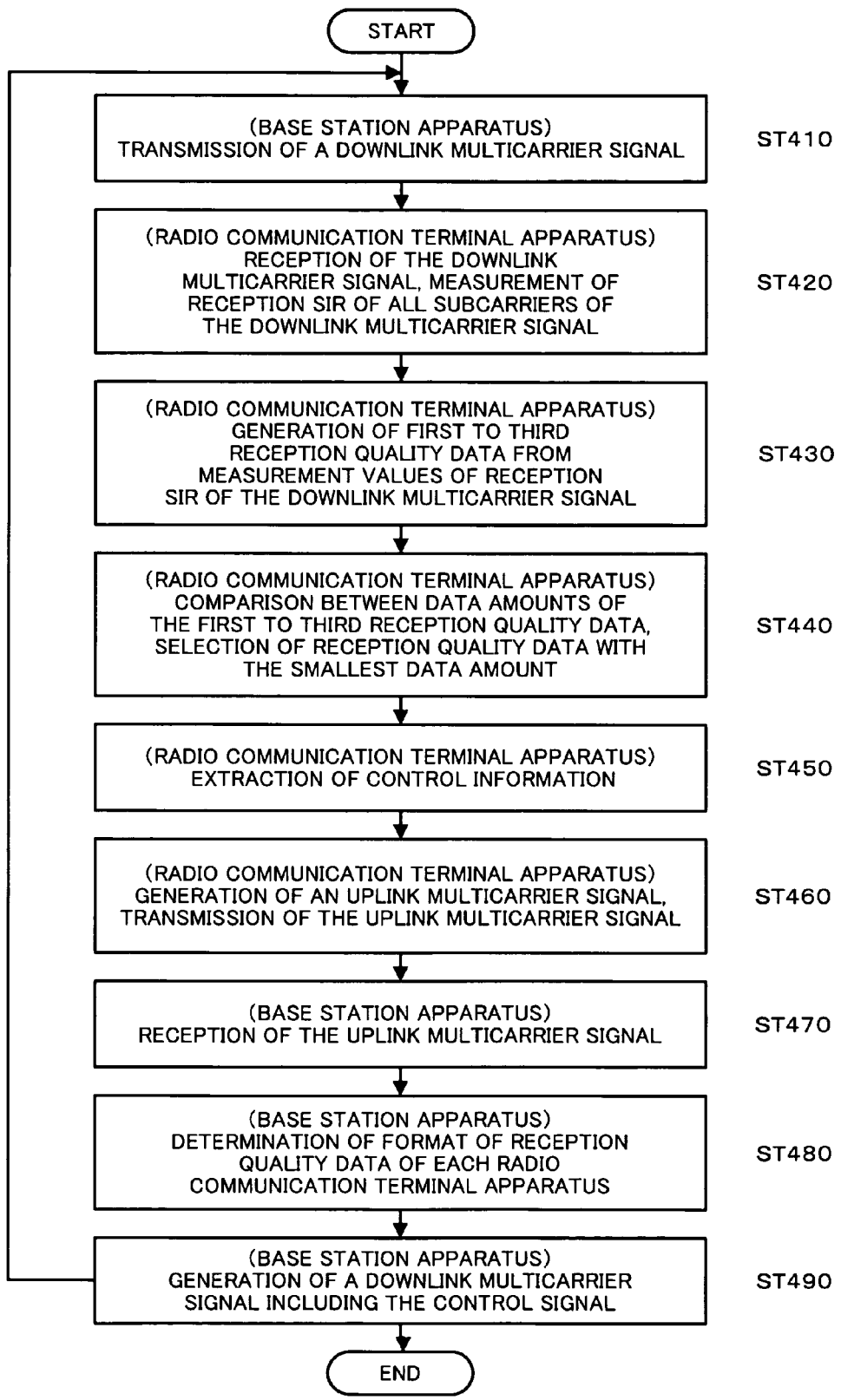
FIG. 4 is a flow diagram to explain a method of notifying reception quality according to Embodiment 1 of the present invention.

The operation of the radio communication system configured with a plurality of radio communication terminal apparatuses 100 and base station apparatus 200 will be described below in detail with reference to a flow diagram as shown in FIG. 4.

First, in step ST410, base station apparatus 200 transmits by radio a downlink multicarrier signal to radio communication terminal apparatus 100.

Next, in step ST420, radio communication terminal apparatus 100 receives the downlink multicarrier signal, and reception quality measuring section 109 measures reception SIR of each of all the subcarriers using a pilot signal included in the downlink multicarrier signal.

Then, in step ST430, reception quality data generating/selecting section 110 compares a measurement result of reception SIR for each subcarrier of the downlink multicarrier signal with threshold value T, generates the first reception quality data from the comparison result, and further generates the second reception quality data and third reception quality data by converting the format of the generated first reception quality data.

Subsequently, in step ST440, reception quality data generating/selecting section 110 compares the data amounts of the first to third reception quality data, and selects the data with the smallest data amount, the third reception quality data in the example as shown in FIG. 3, from the first to third reception quality data.

Next, in step ST450, control information processing section 150 extracts the control information included in the downlink multicarrier signal to acquire the content of the information.

Then, in step ST460, control information processing section 150 instructs mapping section 125 to assign the reception quality data of the downlink multicarrier signal selected in step ST440 to a predetermined subcarrier of an uplink multicarrier signal, according to the control information acquired in step ST450. Further, in step ST460, IFFT section 127 and the like generates the uplink multicarrier signal where the reception quality data of the downlink multicarrier signal is assigned to the predetermined subcarrier, and the signal is transmitted by radio to base station apparatus 200 via antenna element 101.

Next, in step ST470, base station apparatus 200 receives uplink multicarrier signals transmitted at almost the same time from a plurality of radio communication terminal apparatuses 100.

Subsequently, in step ST480, each of format judging sections 216-1 to 216-$n$ checks an identification number of the reception quality data of the downlink multicarrier signal transmitted from respective radio communication terminal apparatuses 100, and thereby makes a judgment on which format the reception quality data has, i.e. on whether the reception quality data is the first, second or third reception quality data.

Then, in step ST490, based on the measurement result of reception SIR for each subcarrier of the uplink multicarrier signal, uplink SC assignment determining section 221 assigns a subcarrier of the uplink multicarrier signal for use in subsequent transmission of the reception quality data of the downlink multicarrier signal preferentially to radio communication terminal apparatus 100 transmitting the second reception quality data or third reception quality data rather than radio communication terminal apparatus 100 transmitting the first reception quality data. Further, in step ST490, downlink SC assignment determining section 222 assigns subcarriers of the downlink multicarrier signal to each of a plurality of radio communication terminal apparatuses 100 by applying the well-known algorithm to the reception quality data for each subcarrier of the downlink multicarrier signal. Furthermore, in step ST490, coding section 211 in terminal response section 210 generates the control information having the information of subcarriers assigned to the downlink and uplink multicarrier signals. Then, in step ST490, the downlink multicarrier signal including the generated control information is generated, and the generated downlink multicarrier signal is transmitted by radio to each of a plurality of radio communication terminal apparatuses 100.

When base station apparatus 200 performs radio communication continuously with some of radio communication terminal apparatuses 100 after executing step ST490, the processing flow returns to step ST410, and each of above-mentioned steps is carried out sequentially.

Thus, in the method of notifying reception quality according to this Embodiment, base station apparatus 200 assigns a subcarrier of an uplink multicarrier signal preferentially to radio communication terminal apparatus 100 transmitting the second or third reception quality data rather than radio communication terminal apparatus 100 transmitting the first reception quality data. Even when base station apparatus 200 determines in error the identification number indicating the format of the first reception quality data of a fixed length, base station apparatus 200 can judge that the reception quality data is the first reception quality data from the data length. Meanwhile, when base station apparatus 200 determines in error the identification number indicating the format of the second or third reception quality data, base station apparatus 200 cannot correctly recognize the format of the reception quality data. Therefore, according to the method of notifying reception quality according to this Embodiment, radio communication terminal apparatus 100 with a high possibility of transmitting the second or third reception quality data strongly affected by an error of the identification number is made to preferentially use a subcarrier with excellent reception quality in an uplink multicarrier signal, and it is thereby possible to reduce the error in the determination of the reception quality data of the downlink multicarrier signal in base station apparatus 200. In addition, when the variation in propagation path is moderate, since the possibility is high that the format of the reception quality data of subsequent downlink multicarrier signals is the same as the last format, base station apparatus 200 can predict the format.

Further, according to the method of notifying reception quality according to this Embodiment, to each of a plurality of base station apparatuses 100, base station apparatus 200 assigns subcarriers to be used in subsequent uplink multicarrier signals based on the measurement result of reception SIR for each subcarrier of the uplink multicarrier signal, and further assigns subcarriers of subsequent downlink multicarrier signals based on the reception quality data of the downlink multicarrier signal, and it is thus possible to improve the reception quality of subsequent uplink and downlink multicarrier signals. As a result, according to the method of notifying reception quality according to this Embodiment, it is possible to reduce the error rate of the reception quality data of the downlink multicarrier signal in base station apparatus 200, while decreasing the frequency of retransmission of uplink and downlink multicarrier signals between radio communication terminal apparatus 100 and base station apparatus 200, and therefore, the throughput can be improved both on uplink and downlink.

Furthermore, according to the method of notifying reception quality according to this Embodiment, since reception quality data generating/selecting section 110 selects the reception quality data with the smallest data amount from a plurality of generated reception quality data of the downlink multicarrier signal, it is possible to release uplink channel resources conventionally used for transmission of the reception quality data of the downlink multicarrier signal and improve the uplink throughput.

Still furthermore, according to the method of notifying reception quality according to this Embodiment, formats are all simple in the first to third reception quality data of the downlink multicarrier signal generated in reception quality data generating/selecting section 110, and it is thereby possible to generate a plurality of items of reception quality data with different data amounts on the downlink multicarrier signal in real time without increasing the load of the signal processing on reception quality data generating/selecting section 110.

Moreover, according to the method of notifying reception quality according to this Embodiment, reception quality data generating/selecting section 110 generates the first reception quality data by simply expressing by bits a comparison result between a measurement value of reception SIR for each subcarrier of the downlink multicarrier signal with predetermined threshold value T in ascending order of the subcarrier number, further generates the second reception quality data and third reception quality data both expressed by bits by converting the format of the first reception quality data, and it is therefore possible to generate a plurality of items of reception quality data with different data amounts on the downlink multicarrier signal by simple technique.

Further, according to the method of notifying reception quality according to this Embodiment, each of the first to third reception quality data of the downlink multicarrier signal is provided in at least one of its beginning and last part with a respective different identification number expressed by bits, and it is thereby possible for base station apparatus 200 to easily determine a format of the reception quality data of the downlink multicarrier signal transmitted from radio communication terminal apparatus 100.

Furthermore, according to the method of notifying reception quality according to this Embodiment, since base station apparatus 200 specifies a subcarrier of the uplink multicarrier signal for use in transmission of the reception quality data of the downlink multicarrier signal to each of a plurality of radio communication terminal apparatuses 100 that performs simultaneous communication, such a situation is avoided that a plurality of radio communication terminal apparatuses 100 transmit the reception quality data of the downlink multicarrier signal to base station apparatus 200 using the same subcarrier on uplink, and it is possible to prevent the reception quality data of the downlink multicarrier signal from being crashed and lost by collision on the propagation path.

Further, according to radio communication terminal apparatus 100 according to this Embodiment, reception quality data generating/selecting section 110 compares a measurement value of reception SIR for each subcarrier of the downlink multicarrier signal with predetermined threshold value T, generates the first reception quality data from a comparison result, further generates a plurality of reception quality data each expressed by bits by converting the format of the first reception quality data, and selects the reception quality data with a smallest data amount from the plurality of generated reception quality data, radio transmission section 128 transmits the reception quality data in the uplink multicarrier signal to base station apparatus 200, and it is thereby possible to release uplink channel resources used for transmission of the reception quality data and improve the uplink throughput.

Moreover, according to base station apparatus 200 according to this Embodiment, since uplink SC assignment determining section 221 specifies a subcarrier of the uplink multicarrier signal for use in transmission of the reception quality data of the downlink multicarrier signal to each of a plurality of radio communication terminal apparatuses 100, such a situation is avoided that a plurality of radio communication terminal apparatuses 100 transmit the reception quality data of the downlink multicarrier signal using the same subcarrier in the uplink multicarrier signal, and it is possible to prevent the reception quality data of the downlink multicarrier signal from being crashed and lost by collision on the propagation path.

In addition, radio communication terminal apparatus 100 according to this Embodiment may be applied and modified as described below.

In this Embodiment the case has been described where reception quality measuring section 109 measures reception SIR for each subcarrier on all the subcarriers of the downlink multicarrier signal, but the present invention is not limited to this case. For example, reception quality measuring section 109 may collect a plurality of adjacent subcarriers as one unit and measure reception SIR of the downlink multicarrier signal on a unit base. Further, for example, reception quality measuring section 109 may sample subcarriers at predetermined frequency intervals and measure reception SIR of the downlink multicarrier signal only on the sampled subcarriers. In this way, it is possible to reduce the load on the reception quality measuring section 109 required to measure reception SIR for each subcarrier of the downlink multicarrier signal.

Further, in this Embodiment, the case has been described where reception quality measuring section 109 measures reception SIR for each subcarrier as the reception quality of the downlink multicarrier signal, but the present invention is not limited to this case. For example, reception quality measuring section 109 may measure a reception power level for each subcarrier of the downlink multicarrier signal.

Furthermore, in this Embodiment, the case has been described where reception quality data generating/selecting section 110 generates the first to third reception quality data of the downlink multicarrier signal, but the present invention is not limited to this case. For example, reception quality data generating/selecting section 110 may generate the first reception quality data and one of the second reception quality data and third reception quality data of the downlink multicarrier signal. In this way, it is possible to reduce the load of the signal processing on reception quality data generating/selecting section 110.

Meanwhile, in this Embodiment, a case has not been particularly described where data amounts of the first to third reception quality data of the downlink multicarrier signal are the same in reception quality data generating/selecting section 110, because such a case is hardly expected. However, when reception quality data generating/selecting section 110 generates the first reception quality data and one of the second reception quality data and third reception quality data of the downlink multicarrier signal as described above, the case can be considered where the data amounts are the same. In such a case, the identification number may be repeatedly added to one of the generated second reception quality data and third reception quality data of the downlink multicarrier signal and form difference from the data amount of the first reception quality data. By this means, reception quality data generating/selecting section 110 always selects the first reception quality data of the downlink multicarrier signal, and it is thus possible to reduce the load of the signal processing on downlink SC assignment determining section 222. This is because a position of each bit constituting the first reception quality data of the downlink multicarrier signal is directly associated with the subcarrier number, and a subcarrier with good reception quality is directly obtained from the position of the constituent bit when the reception quality data is the first reception quality data of the downlink multicarrier signal.

Further, in this Embodiment, the case has been described where the identification number of two bits is used to identify the format of each of the first to third reception quality data of the downlink multicarrier signal, but the present invention is not limited to this case. For example, in the case of using the first reception quality data and one of the second reception quality data and third reception quality data of the downlink multicarrier signal, an identification number of one bit may be used.

Furthermore, in this Embodiment, the case has been described where the information of subcarriers of the uplink multicarrier signal assigned by uplink SC assignment determining section 221 and information of subcarriers of the downlink multicarrier signal assigned by downlink SC assignment determining section 222 are generated as one control information at coding section 211, but the present invention is not limited to this case. For example, each of uplink SC assignment determining section 221 and downlink SC assignment determining section 222 may generate control information independently, for example, at different timings, and the generated control information may be transmitted to a plurality of radio communication terminal apparatuses 100 in different downlink multicarrier signals.

In addition, subcarriers may be grouped to calculate the first to third reception quality on a group basis, and feedback of the quality data is performed using formats different between groups.

Embodiment 2

In Embodiment 2 according to the present invention, a case will be described where the number varies of radio communication terminal apparatuses 500 that simultaneously communicate with base station apparatus 200. Further, it is assumed that base station apparatus 200 obtains in real time the number of radio communication terminal apparatuses 500 that simultaneously communicate with base station apparatus 200, and embeds information of the number in the control information to always notify to each of radio communication terminal apparatuses 500.

Figure 5:
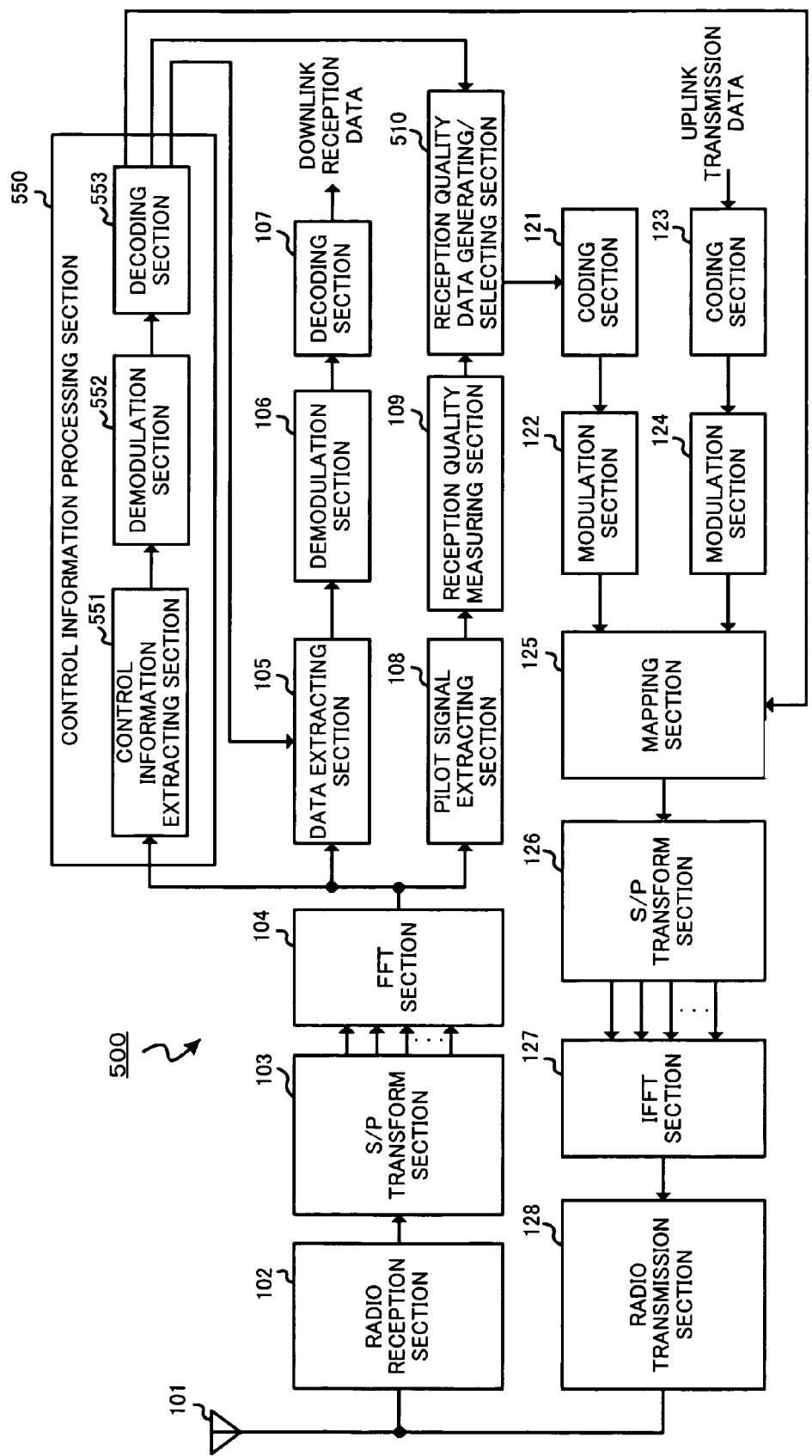
FIG. 5 is a block diagram illustrating a configuration of a radio communication terminal apparatus according to Embodiment 2 of the present invention.

FIG. 5 is a block diagram illustrating a configuration of radio communication terminal apparatus 500 according to Embodiment 2 of the present invention. Radio communication terminal apparatus 500 substitutes reception quality data generating/selecting section 510 for reception quality data generating/selecting section 110 and control information processing section 550 for control information processing section 150 in radio communication terminal apparatus 100 according to Embodiment 1. In addition, radio communication terminal apparatus 500 has a number of structural sections that exhibit the same functions as those in structural sections in radio communication terminal apparatus 100, and such sections are assigned the same reference numerals as in radio communication terminal apparatus 100 without further explanations.

Control information processing section 550 is configured with control information extracting section 551, demodulation section 552 and decoding section 553, and extracts the control information contained in the downlink multicarrier signal transmitted from base station apparatus 200 to perform predetermined received signal processing. More specifically, in control information processing section 550, first, control information extracting section 551 extracts subcarriers assigned for the control information from the downlink multicarrier signal inputted from FFT section 104, demodulation section 552 then demodulates signals of the subcarriers extracted by control information extracting section 551 with a preset scheme, and subsequently, decoding section 553 decodes the signals demodulated in demodulation section 552 with a predetermined scheme to generate the control information. Herein, the generated control information includes information indicating subcarriers assigned in the downlink multicarrier signal to radio communication terminal apparatus 500 by base station apparatus 200, information indicating subcarriers assigned in the uplink multicarrier signal to radio communication terminal apparatus 500 by base station apparatus 200, and information indicating the number of radio communication terminal apparatuses 500 that simultaneously communicate with base station apparatus 200. Then, control information processing section 550 inputs the information indicating subcarriers assigned in the downlink multicarrier signal to radio communication terminal apparatus 500 by base station apparatus 200 to data extracting section 105, inputs the information indicating subcarriers assigned in the uplink multicarrier signal to radio communication terminal apparatus 500 by base station apparatus 200 to mapping section 125, and further inputs the information indicating the number of radio communication terminal apparatuses 500 that simultaneously communicate with base station apparatus 200 to reception quality data generating/selecting section 510.

According to the information of the number of radio communication terminal apparatuses 500 inputted from control information processing section 550, reception quality data generating/selecting section 510 adjusts an increase or decrease of threshold value T. Further, reception quality data generating/selecting section 510 compares a measurement value of reception SIR of each subcarrier of the downlink multicarrier signal inputted from reception quality measuring section 109 with adjusted threshold value T, first, generates first reception quality data indicating by bits the comparison result in ascending order of the subcarrier number, and then, by converting in format the first reception quality data, further generates second reception quality data indicating by bits subcarrier numbers with measurement values of reception SIR of the downlink multicarrier signal more than or equal to adjusted threshold value T, and third reception quality data indicating by bits subcarrier numbers with measurement values of reception SIR of the downlink multicarrier signal less than adjusted threshold value T. Then, reception quality data generating/selecting section 510 compares data amounts of the generated first to third reception quality data, selects reception quality data of the downlink multicarrier signal with the smallest data amount, adds an identification number indicating the format to the selected reception quality data of the downlink multicarrier signal, and inputs the reception quality data of the downlink multicarrier signal with the identification number added to coding section 121.

Figure 6:
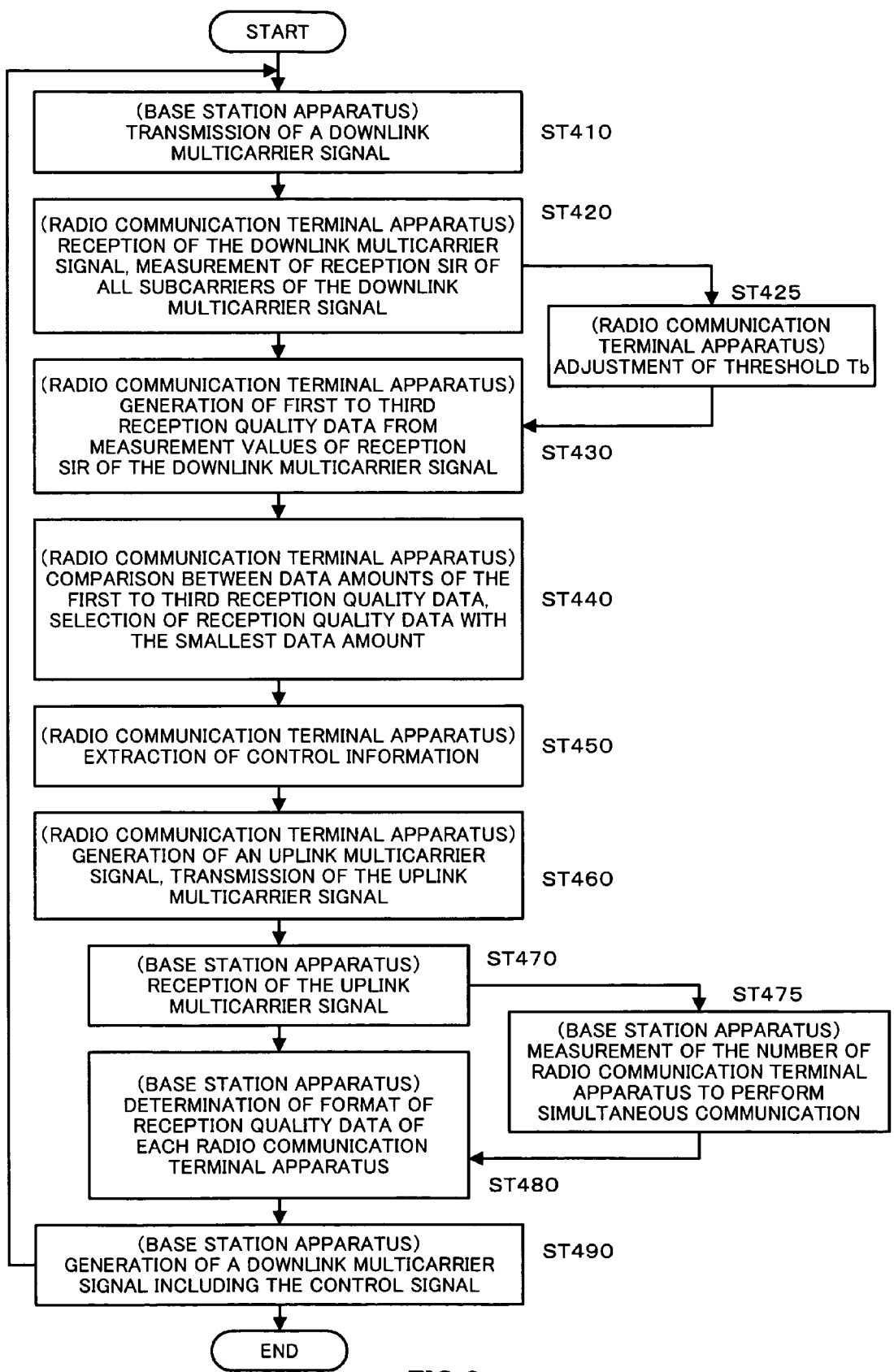
FIG. 6 is a flow diagram to explain a method of notifying reception quality according to Embodiment 2 of the present invention.

Next, the operation of the radio communication system configured with a plurality of radio communication terminal apparatuses 500 and base station apparatus 200 according to this Embodiment will be described. FIG. 6 is a flow diagram illustrating the operation of the radio communication system according to this Embodiment. In FIG. 6, step ST425 is provided between steps ST420 and ST430 of FIG. 4, and ST475 is provided between steps ST470 and ST480 of FIG. 4. Each step as shown in FIG. 6 will be described below. The same steps as shown in FIG. 4 are assigned the same reference numerals as in steps as shown in FIG. 4 without further explanations.

In step ST425, according to the information of the number of radio communication terminal apparatuses 500 that simultaneously communicate with base station apparatus 200 inputted from control information processing section 550, reception quality data generating/selecting section 510 adjusts an increase or decrease of preset threshold value Tb.

In step ST475, base station apparatus 200 measures the number of radio communication terminal apparatuses 500 that simultaneously communicate with base station apparatus 200, and embeds the information of the measured number in the control information in step ST490.

Figure 7:
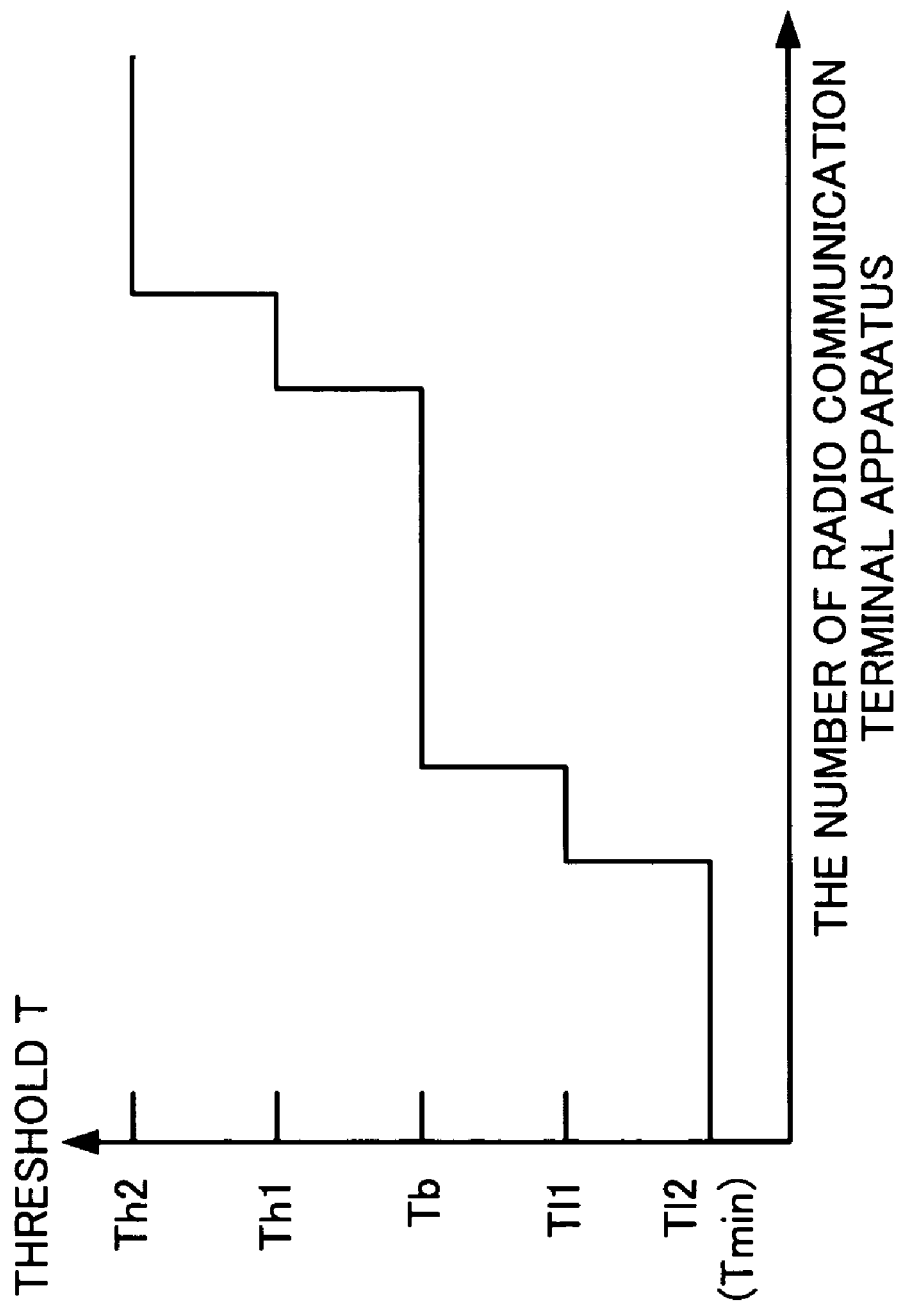
FIG. 7 is a graph illustrating an example of setting of threshold value T for the number of radio communication terminal apparatuses that simultaneously communicate with the base station apparatus in Embodiment 2.

FIG. 7 is a graph illustrating an example of setting of threshold value T for the number of radio communication terminal apparatuses 500 that simultaneously communicate with base station apparatus 200. In FIG. 7, threshold value T is set so as to increase on a step-by-step basis, in accordance with an increase in the number of radio communication terminal apparatuses 500 that simultaneously communicate with base station apparatus 200. More specifically, with reference to threshold value Tb, threshold value T shifts to threshold value Th1 and further to threshold value Th2 so as to increase in accordance with an increase in the number of radio communication terminal apparatuses 500, while shifting to threshold value Tl1 and further to threshold value Tl2 so as to decrease in accordance with a decrease in the number of radio communication terminal apparatuses 500.

As shown in FIG. 7, when threshold value T is set so as to increase or decrease in synchronization with the variation in the number of radio communication terminal apparatuses 500 that simultaneously communicate with base station apparatus 200, the second reception quality data of the downlink multicarrier signal becomes easy to select in reception quality data generating/selecting section 510 in accordance with an increase in the number of radio communication terminal apparatuses 500, while the third reception quality data of the downlink multicarrier signal becomes easy to select in reception quality data generating/selecting section 510 in accordance with a decrease in the number of radio communication terminal apparatuses 500. In other words, when threshold value T is set so as to increase or decrease in synchronization with the variation in the number of radio communication terminal apparatuses 500 that simultaneously communicate with base station apparatus 200, whether the number of radio communication terminal apparatuses 500 increases or decreases, the second reception quality data or third reception quality data is easier to select than the first reception quality data in reception quality data generating/selecting section 510. As a result, regardless of the variation in the number of radio communication terminal apparatuses 500, the uplink throughput is improved in each of radio communication terminal apparatuses 500.

Figure 8:
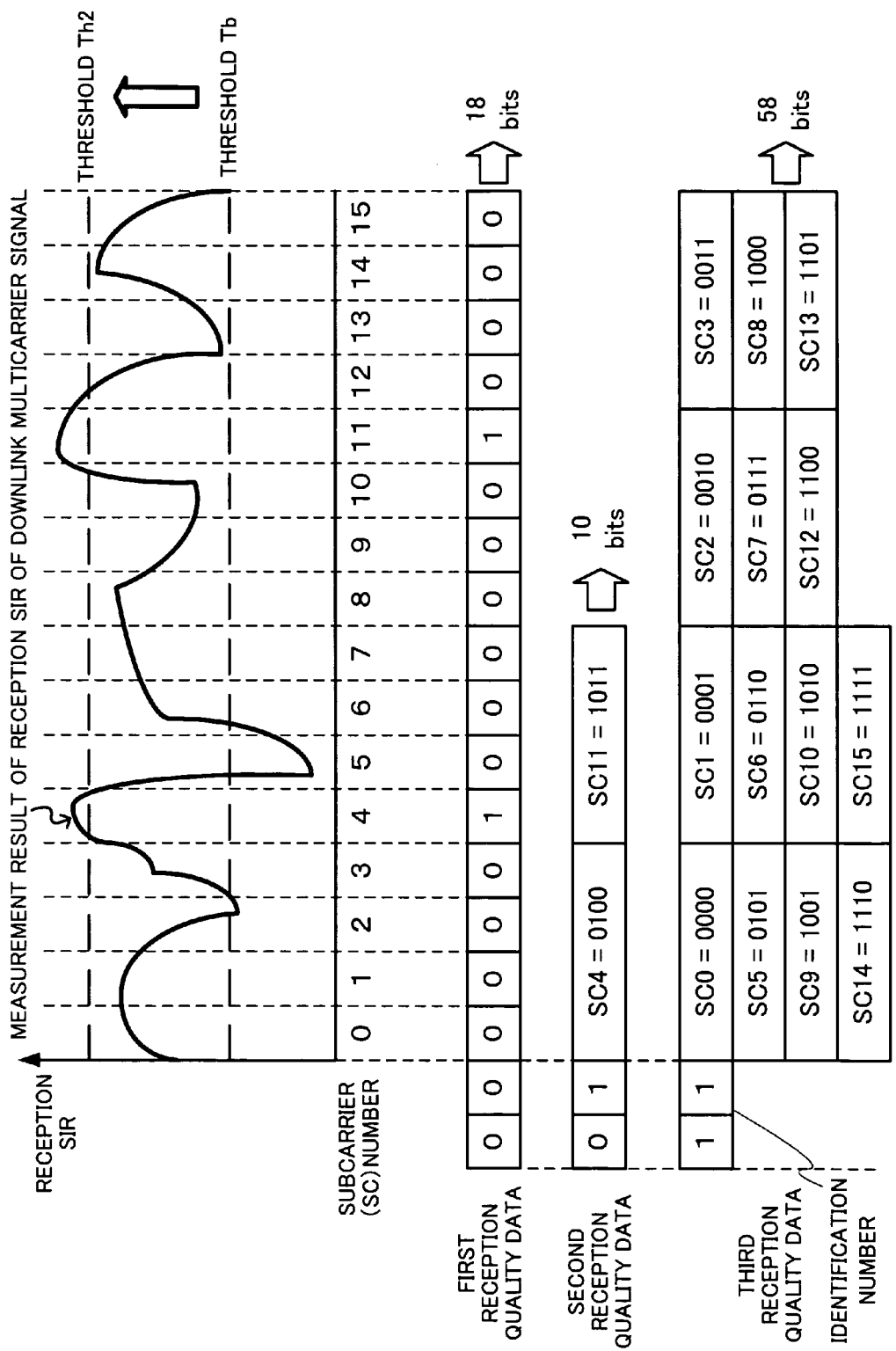
FIG. 8 is a view showing an example of a relationship between a measurement result of reception SIR for each subcarrier of a downlink multicarrier signal and a data amount of each of first to third reception quality data of the downlink multicarrier signal in Embodiment 2.

FIG. 8 shows data amounts of the first to third reception quality data of the downlink multicarrier signal when threshold value Tb increases to threshold value Th2 in accordance with an increase in the number of radio communication terminal apparatuses 500 that simultaneously communicate with base station apparatus 200. In addition, a measurement result of reception SIR of each subcarrier of the downlink multicarrier signal in FIG. 8 is the same as that in FIG. 3, and similarly, threshold value Tb in FIG. 8 is the same as threshold value T in FIG. 3. As shown in FIG. 8, when threshold value Tb increases to threshold value Th2, the data amount of the first reception quality data of the downlink multicarrier signal is 18 bits (fixed length), the data amount of the second reception quality data of the downlink multicarrier signal is 10 bits, and the data amount of the third reception quality data of the downlink multicarrier signal is 58 bits. Accordingly, in the example as shown in FIG. 8, reception quality data generating/selecting section 510 selects the second reception quality data of the downlink multicarrier signal.

Figure 9:
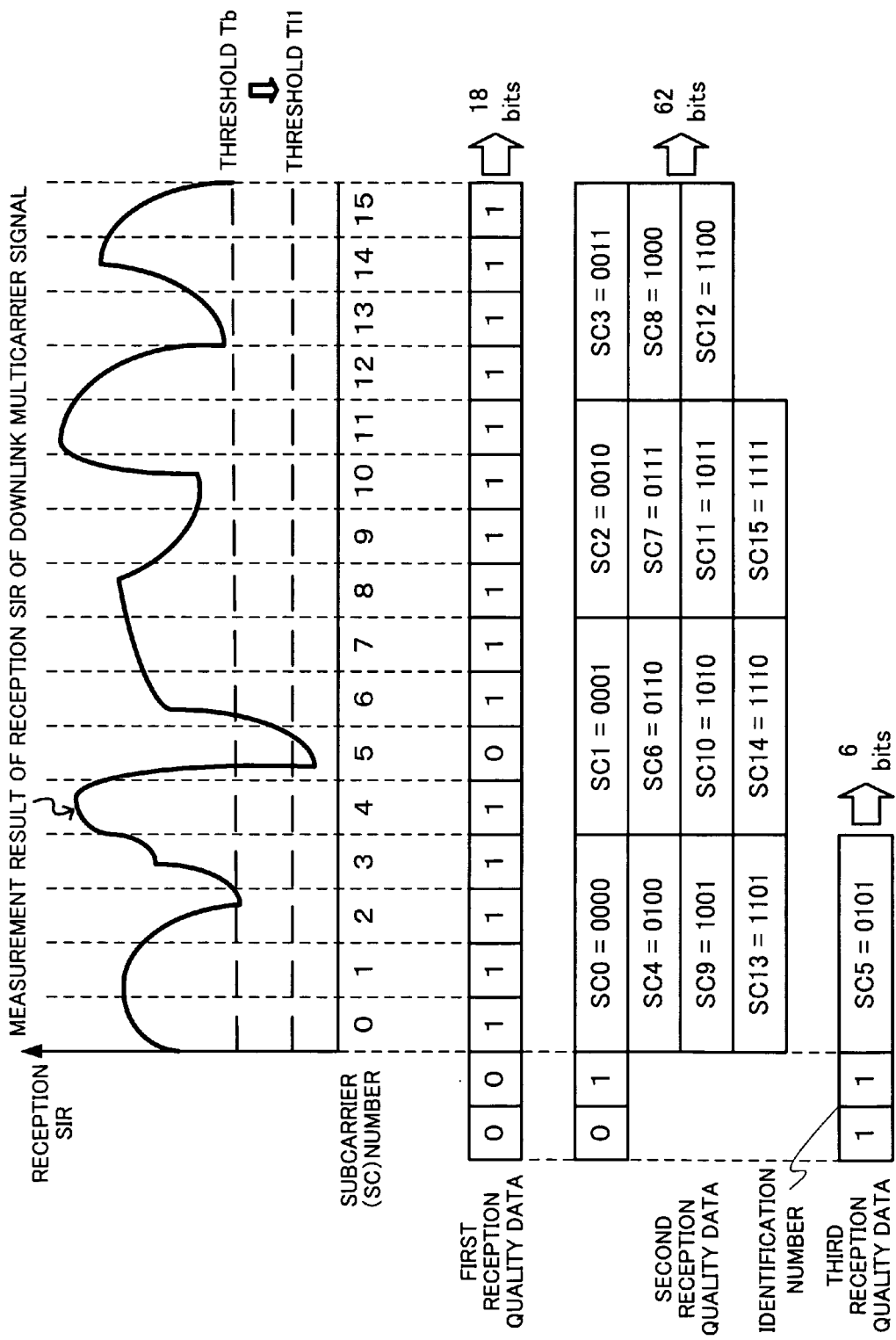
FIG. 9 is a view showing another example of the relationship between a measurement result of reception SIR for each subcarrier of a downlink multicarrier signal and a data amount of each of first to third reception quality data of the downlink multicarrier signal in Embodiment 2.

FIG. 9 shows data amounts of the first to third reception quality data of the downlink multicarrier signal when threshold value Tb decreases to threshold value Tl1 in accordance with a decrease in the number of radio communication terminal apparatuses 500 that simultaneously communicate with base station apparatus 200. In addition, also in FIG. 9, a measurement result of reception SIR of each subcarrier of the downlink multicarrier signal and threshold value Tb are the same as those in FIG. 3. As shown in FIG. 9, when threshold value Tb decreases to threshold value Tl1, the data amount of the first reception quality data of the downlink multicarrier signal is 18 bits (fixed length), the data amount of the second reception quality data of the downlink multicarrier signal is 62 bits, and the data amount of the third reception quality data of the downlink multicarrier signal is 6 bits. Accordingly, in the example as shown in FIG. 9, reception quality data generating/selecting section 510 selects the third reception quality data of the downlink multicarrier signal.

Thus, according to the method of notifying reception quality according to this Embodiment, since threshold value T used in reception quality data generating/selecting section 510 is set so as to increase or decrease according to the variation in the number of radio communication terminal apparatuses 500 that simultaneously communicate with base station apparatus 200, whether the number of radio communication terminal apparatuses 500 increases or decreases, the second reception quality data or third reception quality data of the downlink multicarrier signal is easier to select than the first reception quality data of the downlink multicarrier signal in reception quality data generating/selecting section 510. As a result, according to the method of notifying reception quality according to this Embodiment, regardless of the variation in the number of radio communication terminal apparatuses 500 that simultaneously communicate with base station apparatus 200, it is possible to always improve the throughput to base station apparatus 200 from each of radio communication terminal apparatuses 500.

In addition, radio communication terminal apparatus 500 according to this Embodiment may be applied or modified as described below.

In this Embodiment, the case has been described where threshold value T used in reception quality data generating/selecting section 510 is associated with the absolute amount of the number of radio communication terminal apparatuses 500 that simultaneously communicate with base station apparatus 200, but the present invention is not limited to this case. For example, it may occur that threshold value T used in reception quality data generating/selecting section 510 is prepared as a discrete value, and increases by one unit from current threshold value T when the number of radio communication terminal apparatuses 500 that simultaneously communicate with base station apparatus 200 increases, while decreasing by one unit from current threshold value T when the number of radio communication terminal apparatuses 500 that simultaneously communicate with base station apparatus 200 decreases. In this way, only when the number of radio communication terminal apparatuses 500 that simultaneously communicate with base station apparatus 200 varies, base station apparatus 200 is required to notify the variation in the number of radio communication terminal apparatuses 500 using the downlink multicarrier signal to radio communication terminal apparatuses 500 in current communication. It is thereby possible to reduce the number of times base station apparatus 200 embeds the information of the number of radio communication terminal apparatuses 500 in the control information included in the downlink multicarrier signal and improve the downlink throughput.

Further, in this Embodiment, the case has been described where reception quality data generating/selecting section 510 generates the first to third reception quality data of the downlink multicarrier signal, but the present invention is not limited to this case. For example, it may occur that reception quality data generating/selecting section 510 generates the first and second reception quality data of the downlink multicarrier signal, and threshold value T used in reception quality data generating/selecting section 510 increases when the number of radio communication terminal apparatuses 500 that simultaneously communicate with base station apparatus 200 increases, while decreasing when the number of radio communication terminal apparatuses 500 decreases. In this way, reception quality data generating/selecting section 510 does not need to generate the third reception quality data of the downlink multicarrier signal to compare. It is thus possible to reduce the load of the signal processing on reception quality data generating/selecting section 510, and the second reception quality data of the downlink multicarrier signal becomes easier to select in reception quality data generating/selecting section 510 in accordance with an increase in the number of radio communication terminal apparatuses 500 that simultaneously communicate with base station apparatus 200. Therefore, even when uplink channel resources which can be occupied by each of radio communication terminal apparatuses 500 decrease in accordance with an increase in the number of radio communication terminal apparatuses 500 that simultaneously communicate with base station apparatus 200, it is possible to effectively improve the throughput to base station apparatus 200 from each of radio communication terminal apparatuses 500.

In addition, each of functional blocks used in descriptions of each of above-mentioned Embodiments is implemented typically as an LSI that is an integrated circuit. Each of the blocks may be configured in one-chip form, or one chip may include part or all of the blocks.

Herein, the LSI is assumed, but the circuit may be referred to as an IC, system LSI, super LSI, ultra LSI or the like depending on the degree of integration.

Further, the method of integrating circuits is not limited to the LSI, and may be achieved by a dedicated circuit or general processor. It may be possible to use FPGA (Field Programmable Gate Array) enabling programming after manufacturing the LSI, a reconfigurable processor enabling reconfiguration of connection or setting in the circuit cell inside the LSI, or the like.

Furthermore, if technique appears for integrating circuits substituting for the LSI with progress in semiconductor technique or another derived technique, the functional blocks will naturally be integrated using such technique. There is a possibility of adaptation of biotechnology and the like.

The present application is based on Japanese Patent Application No. 2004-71277 filed on Mar. 12, 2004, entire content of which is expressly incorporated by reference herein.

INDUSTRIAL APPLICABILITY

The method of notifying reception quality, radio communication terminal apparatus and base station apparatus according to the present invention have the effect of releasing uplink channel resources used in transmission of the reception quality data of a downlink multicarrier signal and improving the uplink throughput, and are suitable for use in an OFDM radio communication system and the like.

The invention claimed is:

1. A reception quality notifying method comprising:
    receiving a multicarrier signal;
    measuring reception quality of the multicarrier signal on a subcarrier basis;
    comparing the measured reception quality of each subcarrier of the multicarrier signal, with a predetermined threshold value:
    performing format conversion on the comparison result, using a plurality of different references, to generate a plurality of reception quality data that have different formats and that are expressed by bits, the plurality of reception quality data including first reception quality data in which the comparison result is expressed by bits in ascending order of subcarrier numbers of subcarriers constituting the multicarrier signal, and at least one of second reception quality data in which subcarrier numbers of subcarriers with reception quality greater than or equal to the threshold value are expressed by bits based on the comparison result and third reception quality data in which subcarrier numbers of subcarriers with reception quality less than the threshold value are expressed by bits based on the comparison result;
    selecting reception quality data with a smallest data amount, from the plurality of generated reception quality data; and
    transmitting the selected reception quality data.

2. The reception quality notifying method according to claim 1, wherein the plurality of reception quality data include the first reception quality data and the second reception quality data, and further comprising: increasing the threshold value when the number of other radio communication terminal apparatuses that perform communication using the multicarrier signal increases, and decreasing the threshold value when the number of the other radio communication terminal apparatuses decreases.

3. The reception quality notifying method according to claim 1, wherein the plurality of reception quality data include the first reception quality data, the second reception quality data, and the third reception quality data; and further comprising: increasing the threshold value when the number of other radio communication terminal apparatuses that perform communication using the multicarrier signal increases, and decreasing the threshold value when the number of the other radio transmission apparatuses decreases.

4. The reception quality notifying method according to claim 1, wherein the first reception quality data, the second reception quality data or the third reception quality data is provided with a different identification number expressed by bits in at least one of a beginning part and a last part.

5. A radio communication terminal apparatus comprising:
a receiver that receives a downlink multicarrier signal;
a measurer that measures reception quality of the downlink multicarrier signal on a subcarrier basis;
a generator that compares the measured reception quality of each subcarrier of the multicarrier signal, with a predetermined threshold value, and performs format conversion on the comparison result, using a plurality of different references, to generate a plurality of reception quality data that have different formats and that are expressed by bits, the plurality of reception quality data generated by the generator including first reception quality data in which the comparison result is expressed by bits in ascending order of subcarrier number of subcarriers constituting the multicarrier signal, and at least one of second reception quality data in which subcarrier numbers of subcarriers with reception quality greater than or equal to the threshold value are expressed by bits based on the comparison result and third reception quality data in which subcarrier numbers of subcarriers with reception quality less than the threshold value are expressed by bits based on the comparison result;
a selector that selects reception quality data with a smallest data amount from the plurality of generated reception quality data; and
a transmitter that transmits an uplink multicarrier signal including the selected reception quality data.

6. The radio communication terminal apparatus according to claim 5, wherein the plurality of reception quality data generated by the generator include the first reception quality data, and the second reception quality data, and further comprising a threshold value adjuster that increases the threshold value in the generator when the number of other radio communication terminal apparatuses that perform communication using the multicarrier signal increases, and decreases the threshold value when the number of the other radio communication terminal apparatuses decreases.

7. The radio communication terminal apparatus according to claim 5, wherein the plurality of reception quality data generated by the generator include the first reception quality data, the second reception quality data, and the third reception quality data; and further comprising a threshold value adjuster that increases the threshold value in the generator when the number of other radio communication terminal apparatuses that perform communication using the multicarrier signal increases, and decreases the threshold value when the number of the other radio transmission apparatuses decreases.

8. The radio communication terminal apparatus according to claim 5, wherein the first reception quality data, the second reception quality data or the third reception quality data is provided with a different identification number expressed by bits in at least one of a beginning part and a last part.

9. A base station apparatus that performs radio communication with the radio communication terminal apparatus, comprising:
a transmitter that transmits downlink multicarrier signals to a plurality of radio communication terminal apparatuses;
a receiver that receives uplink multicarrier signals including reception quality data indicating reception quality of the downlink multicarrier signals transmitted from the plurality of radio communication terminal apparatuses;
a determiner that determines formats of the reception quality data included in the uplink multicarrier signals for each of the plurality of radio communication terminal apparatuses, wherein the formats include a format of first reception quality data in which the comparison result is expressed by bits in ascending order of subcarrier number of subcarriers constituting the multicarrier signal, a format of second reception quality data in which subcarrier numbers of subcarriers with reception quality greater than or equal to the threshold value are expressed by bits based on the comparison result, and a format of third reception quality data in which subcarrier numbers of subcarriers with reception quality less than the threshold value are expressed by bits based on the comparison result; and
an assignment determiner that determines respective subcarriers to be assigned to the plurality of radio communication terminal apparatuses in accordance with the determined formats.

10. A subcarrier assignment method comprising:
transmitting downlink multicarrier signals to a plurality of radio communication terminal apparatuses;
receiving uplink multicarrier signals including reception quality data indicating reception quality of the downlink multicarrier signals transmitted from the plurality of radio communication terminal apparatuses;
determining formats of the reception quality data included in the uplink multicarrier signals for each of the plurality of radio communication terminal apparatuses, wherein the formats include a format of first reception quality data in which the comparison result is expressed by bits in ascending order of subcarrier number of subcarriers constituting the multicarrier signal, a format of second reception quality data in which subcarrier numbers of subcarriers with reception quality greater than or equal to the threshold value are expressed by bits based on the comparison result, and a format of third reception quality data in which subcarrier numbers of subcarriers with reception quality less than the threshold value are expressed by bits based on the comparison result; and
determining respective subcarriers to be assigned to the plurality of radio communication terminal apparatuses in accordance with the determined formats.

* * * * *